United States Patent
Labadie et al.

(10) Patent No.: US 11,706,635 B2
(45) Date of Patent: Jul. 18, 2023

(54) SCALABLE NETWORK ARCHITECTURE

(71) Applicant: Amazon Technologies, Inc., Seattle, WA (US)

(72) Inventors: Nathan Labadie, Gilroy, CA (US); Tzung-I Lee, San Jose, CA (US); Omar Fawazhashim Zakaria, Saratoga, CA (US); Subram Narasimhan, Saratoga, CA (US); Cheol Su Kim, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 353 days.

(21) Appl. No.: 16/707,372

(22) Filed: Dec. 9, 2019

(65) Prior Publication Data

US 2021/0176648 A1    Jun. 10, 2021

(51) Int. Cl.
| | |
|---|---|
| H04W 16/20 | (2009.01) |
| H04L 12/44 | (2006.01) |
| H04L 12/28 | (2006.01) |
| H04W 88/08 | (2009.01) |
| H04W 88/16 | (2009.01) |

(52) U.S. Cl.
CPC ............ *H04W 16/20* (2013.01); *H04L 12/44* (2013.01); *H04L 12/2856* (2013.01); *H04W 88/08* (2013.01); *H04W 88/16* (2013.01)

(58) Field of Classification Search
CPC ..... H04W 16/20; H04W 16/32; H04W 88/08; H04W 88/16; H04W 84/047; H04L 12/44; H04L 12/2856
See application file for complete search history.

(56) References Cited

U.S. PATENT DOCUMENTS

| | | | |
|---|---|---|---|
| 7,983,685 B2 | 7/2011 | Silverstrim | |
| 9,621,294 B2* | 4/2017 | Cui | .............. H04W 72/1278 |
| 9,800,494 B2* | 10/2017 | Sindhu | .............. H04L 45/50 |
| 10,477,411 B1 | 11/2019 | Liu | |
| 2009/0029645 A1 | 1/2009 | Leroudier | |
| 2009/0232026 A1* | 9/2009 | Lu | ................. H04W 40/12 |
| | | | 370/254 |

(Continued)

FOREIGN PATENT DOCUMENTS

| | | |
|---|---|---|
| EP | 3490322 A1 | 5/2019 |
| NO | 2020251832 A1 | 12/2020 |

OTHER PUBLICATIONS

International Search Report and Written Opinion dated May 3, 2021, on Application No. PCT/US2020/063320.

*Primary Examiner* — Redentor Pasia
(74) *Attorney, Agent, or Firm* — Lowenstein Sandler LLP

(57) ABSTRACT

Technologies directed to a wireless network with a cascaded star topology with multiple devices at multiples nodes are described. In one wireless network, multiple devices are manufactured as a common device type and deployed at different nodes of the wireless network. The devices are configured to operate as a base station (BS) role, a gateway (GW) role, a relay (RL) role, or a customer station (STA) role. The nodes can be a base station node (BSN), a relay node (RLN), or a customer premises equipment (CPE) node. One node can be a first-tier hub of the cascaded star topology and another node can be a second-tier hub of the cascaded star topology.

18 Claims, 17 Drawing Sheets

(56) References Cited

U.S. PATENT DOCUMENTS

| | | | |
|---|---|---|---|
| 2011/0182253 A1* | 7/2011 | Shekalim | H04W 28/18 370/328 |
| 2013/0083691 A1* | 4/2013 | Murphy | H04W 12/069 370/254 |
| 2013/0083724 A1* | 4/2013 | Sindhu | H04L 45/50 370/328 |
| 2016/0278100 A1* | 9/2016 | Sawai | H04W 84/10 |
| 2016/0381694 A1* | 12/2016 | Yano | H04W 8/005 370/329 |
| 2017/0006512 A1* | 1/2017 | Hole | H04W 36/08 |
| 2017/0366458 A1* | 12/2017 | Chan | H04L 61/6022 |
| 2018/0026481 A1* | 1/2018 | Ku | H02J 50/23 370/329 |
| 2018/0270764 A1* | 9/2018 | Furuichi | H04W 52/386 |
| 2018/0324711 A1* | 11/2018 | Tsuda | H04W 72/0426 |
| 2018/0331914 A1* | 11/2018 | Yoshida | H04W 8/005 |
| 2018/0368006 A1* | 12/2018 | Furuichi | H04W 16/32 |
| 2019/0254036 A1* | 8/2019 | Uchiyama | H04W 72/0453 |
| 2021/0092674 A1* | 3/2021 | Hampel | H04W 76/10 |

\* cited by examiner

SCALABLE NETWORK ARCHITECTURE

BACKGROUND

A large and growing population of users is enjoying entertainment through the consumption of digital media items, such as music, movies, images, electronic books, and so on. The users employ various electronic devices to consume such media items. Among these electronic devices (referred to herein as endpoint devices, user devices, clients, client devices, or user equipment) are electronic book readers, cellular telephones, Personal Digital Assistants (PDAs), portable media players, tablet computers, netbooks, laptops, and the like. These electronic devices wirelessly communicate with a communications infrastructure to enable the consumption of the digital media items. In order to communicate with other devices wirelessly, these electronic devices include one or more antennas.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
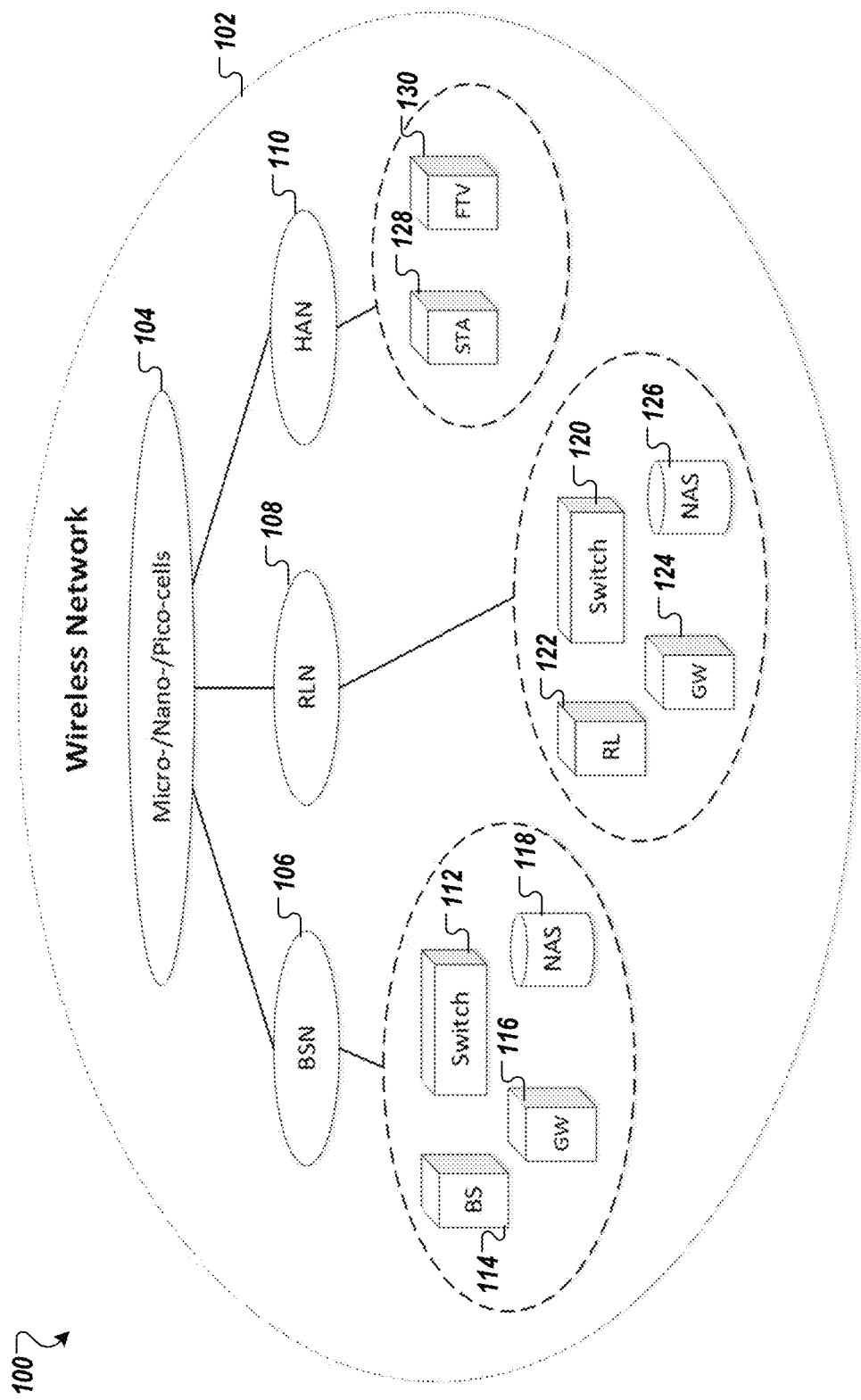
FIG. 1 is a network diagram of a wireless network that is logically organized into the following hierarchical units: cells, nodes, and devices according to one embodiment.

Technologies directed to a wireless network with a cascaded star topology with multiple devices at multiples nodes are described. The 2.4 GHz and 5 GHz industrial, scientific, and medical (ISM) radio bands allow unlicensed wireless communications. Due to its unlicensed nature, many short ranged, low power wireless communication systems operate in these frequency bands. As such, there is a limited de-license spectrum in various locations, including India (e.g., 2.4 GHz ISM and 5 GHz U-NII bands). Various devices are described herein that include wireless local area network (WLAN) radios operate in the 2.4 GHz and 5 GHz U-NII-1 bands and utilize various WLAN protocols, such as the Wi-Fi® protocols (e.g., 802.11n, 802.11ac, or the like). The radios can utilize 2×2 spatial multiplexing MIMO and channel bandwidths from 20 MHz to 40 MHz. The radios can see all 5.x GHz channels, including Dynamic Frequency Selection (DFS) channels and can operates at an Equivalent Isotropically Radiated Power (EIRP) up to 36 dBmi, depending on the channel. The devices described herein can be deployed in a wireless network having a hierarchical topology between an Internet Service Provider (ISP) ingress to a subscriber. In various embodiments, the wireless network is logically organized as a cascaded star topology as described in more detail below.

The network architecture described herein is capable of providing Video on Demand (VoD) and Internet services to customers at scale. The network architecture described herein can be deployed in areas with limited, traditional ISP infrastructure, such as in India, for example. These services can be enabled by a combination of wired ingress, wireless connectivity, and tiered content caching in the network architecture described herein. At a high level, the network architecture of the wireless networks described herein are logically organized into hierarchical units, referred to herein as cell units, nodes, and devices, such as described and illustrated with respect to FIG. 1.

The embodiments described herein relate to a network architecture to deliver both video on demand (VoD) and internet to customers in locations with limited internet infrastructure. The network architecture includes technology for distribution of VoD and Internet services to the customers using wired and wireless links. The network devices are organized into three logical units known as nodes: base station nodes (BSNs), relay nodes (RLNs), and customer premises equipment (CPE) nodes (also referred to as Home access node (HAN)). Each node supports a unique set of network functions. The CPE node provides connectivity for in-home customer devices (FireTV, laptop) to the outdoor wireless access network. RLN aggregate the wireless access traffic from the CPEs and pass this data back to a central BSN over a wireless distribution network. The BSN aggregates both the RLN wireless distribution and local wireless access traffic to a fiber ingress point. The devices at the nodes can be manufactured as a common device type and programmed according to any of the following device roles: a router (RT) role, a base station (BS) role, a gateway (GW)

role, a relay (RL) role, or a customer station (STA) role. That is, the devices can each include identical hardware and can each be programmed to operate as a one of a RT, a BS, a GW, a RL, a customer STA, a NAS, or the like.

FIG. 1 is a network diagram of a wireless network 100 that is logically organized into the following hierarchical units: cells, nodes, and devices according to one embodiment. A "cell unit" 102 is a collection of wired connections and wireless connections arranged in a cellular structure. It should be noted that cell unit 102 is not a cell of a cellular wireless network. The cell unit 102 is made up of smaller cell units 104, called pico-cell units, nano-cell units, and micro-cell units. As described herein, a pico-cell unit is a cell unit that includes customer premise equipment at customer premises (e.g., buildings, houses, or the like). The pico-cell unit is served by gateway devices from a single base station node or a relay node. A nano-cell unit is a cell unit that includes one or more pico-cell units. The nano-cell unit is served by base station devices from a single base station node. A micro-cell unit is a cell unit that includes one or more nano-cell units. The nano-cell units of the micro-cell are is connected via a wireless network.

A "node" is a logical network building block that is sub-divided into "infrastructure" (e.g., base station nodes, relay nodes, or the like) and "customer premises equipment (CPE)." The wireless network 100 can include the following "nodes:" a base station node (BSN) 106, a relay node (RLN) 108, a storage (NAS) node (not illustrated in FIG. 1), and a CPE node 110 (also referred to as a home access node (HAN). A BSN 106 connects to an Internet Service Provider (ISP) ingress via a router device, provides a first coverage (e.g., BS coverage) to the RLN 108, and provides a second coverage (e.g., gateway coverage) to a first CPE node, such as CPE node 110. The RLN 108 connects to the BSN 106 through a relay device and provides a third coverage (e.g., gateway coverage) to a second CPE node (not illustrated in FIG. 1). The CPE node 110 can include one or more customer stations that provide one or more access points for one or more endpoint devices at the customer premises. The first coverage can be a first wireless service the second coverage can be a second wireless service, and the third coverage can be a third wireless service.

As illustrated in FIG. 1, the BSN 106, the RLN 108, and the CPE node 110 are organized logically in a cascaded star topology. In the cascaded star topology, the BSN 106 can be a first-tier hub with respect to the RLN 108 and the first CPE node 110. In addition, in the cascaded star topology, the RLN 108 can be a second-tier hub with respect to the second CPE node (not illustrated in FIG. 1). It should be noted that the RLN 108 could be considered a third-tier hub if there were an intervening RLN between RLN 108 and the BSN 106. That is, the RLN 108 can establish another wireless link between one or more RLNs back to the BSN 106. The cascaded star topology is a configuration of a star network that can use hubs on spokes of the star network to expand or cascade the network into additional star networks. Alternatively, the BSN 106, the RLN 108, and the CPE node(s) 110 can be organized in other multi-star networks or other chained interface configurations.

The network architecture of the wireless network 100 is itself device agnostic, although various embodiments described herein can utilize wireless network devices that are each manufactured as a common device type (e.g., single SKU product) and programmed to operate as a "device role." A "device role" is a set of specific network functions associated with one or more network devices, such as a primary wireless network device (also referred to herein as "wireless device," "network device," or "D2") that is configured according to a device role (e.g., a gateway device, a customer station, or the like). For example, a wireless device that is configured according to the gateway role operates as a gateway (GW). In various embodiments, the common device type can be programmed to operate according to one of the following device roles: a router (RT) role, a base station (BS) role, a relay (RL) role, a gateway (GW) role, a customer station (STA) role, or a storage (NAS) role. It should be noted that the nodes of the wireless network 100 are logically organized, whereas the devices of a particular node are physically organized at a location of a customer premise, such as a single dwelling unit (SDU), a multi-dwelling unit (MDU), or at other buildings or structures as described below.

The BSN 106 can include a network switch 112 and multiple wireless devices of the common device type. The multiple wireless devices of the BSN 106 can include a base station device 114, a gateway device 116, and a storage device 118. The base station device 114 is a wireless network device that is programmed to operate as the BS. The gateway device 116 is a wireless network device that is programmed to operate according to the GW role. The storage device 118 is a wireless network device that includes one or more attached storage mediums, such as USB connected storage media (e.g., HDD, SSD, or the like), is programmed to operate according to the NAS role. That is, the storage device 118 can be programmed to operate as a storage controller to the attached storage mediums.

The RLN 108 can include a network switch 120 and multiple wireless devices of the common device type. The multiple wireless devices of the RLN 108 can include a relay device 122, a gateway device 124, and an optional storage device 126. The relay device 122 is a wireless network device that is programmed to operate as the RL. The gateway device 124 is a wireless network device that is programmed to operate as the GW. The optional storage device 126 is a wireless network device that includes one or more attached storage mediums, such as USB connected storage media (e.g., HDD, SSD, or the like), is programmed to operate as the NAS. That is, the optional storage device 126 can be programmed to operate as a storage controller to the attached storage mediums. By using common device types for these devices, flexible multi-use capability across the wireless network 100 can be achieved with relatively low cost and ease of software development. It should also be noted that the common device type can be used for a router device (not illustrated in FIG. 1), as well as the content storage functions. Alternatively, other types of devices can be used for the routing and storage functions of the wireless network 100.

The CPE node 110 can include one or more devices (referred to herein as customer premises equipment), including one or more customer stations 128 and one or more endpoint devices 130. For example, the customer station 128 can be the wireless network device that is manufactured according to the common device type and programmed to operate as the customer STA. The one or more endpoint devices 130 can be various types of wireless devices, such as mobile devices, smart TVs, TV dongles, watches, IoT devices, thermostats, home automation equipment, laptops, computers, entertainment consoles, gaming consoles, voice-controlled devices, or the like.

In one embodiment, the base station device (i.e., BS role) can use one or more radios to provide a first multi-sector, point-to-multi-point (PtMP) coverage to one or more relay devices up to a first distance, the first distance being approximately 100 meters, for example. The base station device can use the one or more radios to provide the first wireless service to the relay node and any other relay nodes that are located within the first distance from the base station device to one or more additional customer stations up to a fourth distance, the fourth distance being approximately 30 meters, for example. The second gateway device can use the one or more radios to provide the third wireless service to the first CPE node and any other CPE nodes that are located within a fourth distance from the second gateway device. As noted above, one or more external storage mediums (at the BSN 106) can be coupled to the storage device 118 and the storage device 118 operates as a first storage controller to the one or more external storage mediums. Similarly, one or more additional external storage mediums are coupled to the optional storage device 126 at the RLN 108 and the second storage device operates as a second storage controller to the one or more external storage mediums.

In one embodiment, the radios of the wireless network 100 can utilize wireless protocols, such as IEEE 802.11n, IEEE 802.11ac, or the like, such as set forth in Table 1.

TABLE 1

| | 802.11n | | 802.11ac | |
|---|---|---|---|---|
| Item | IEEE | Proposed Network | IEEE | Proposed Network |
| Release | October 2009 | | January 2014 | |
| Application | Household device connectivity (e.g., VOD service, phone, tablets) | | Infrastructure connectivity (N1 mesh, N2 star) | |
| Channel | 20/40 MHz | 20 MHz | 20/40/80/160 MHz | 20/40 MHz |
| Max Phy Rate | 600 Mbps | 140 Mbps | 1 Gbps | 400 Mbps |
| Max TCP Rate | ~400 Mbps | 1000 Mbps | ~800 Mbps | 300 Mbps |
| MIMO Type | Single user | | Single user, Multi-user | |
| MIMO Stream | 4 × 4 | 2 × 2 | 8 × 8 | 2 × 2 |
| MAC Mechanism | Frame aggregation (A-MSDU and A-MPDU), Block Ack, Reverse direction (RD) | | Enhanced Frame Aggregation (large sizes) | |
| PHY Layer (modulation) | BPSK/QSK/16QAM/64QAM | | BPSK/QSK/16QAM/64QAM/256QAM | |
| Frequency Band | 2.4/5.x | 2.4 | 5.x | 5.x |
| Type | High Throughput | | Very High Throughput | |
| Number of Channels | | 3 × 20 MHz | | 5 × 40 MHz (non-DFS) + 8 × 40 MHz (DFS) |
| Protocol | CSMA-CA | | | |

The relay device can use one or more radios to provide a single sector, point-to-point (PtP) connectivity to the base station device up to a second distance, the second distance being approximately 100 meters, for example. The relay device can use the one or more radios to connect with the base station device via the first wireless service and provide the third wireless service to the first CPE node and any other CPE nodes that are located within the second distance from the relay device. A first gateway device (at the BSN 106) can use one or more radios to provide a second multi-sector, PtMP coverage to one or more customer stations up to a third distance, the third distance being approximately 30 meters, for example. The first gateway device can use the one or more radios to provide the second wireless service to the second CPE node and any other CPE nodes that are located within the third distance from the first gateway device. A second gateway device (at the RLN 108) can use one or more radios to provide a third multi-sector, PtMP coverage As described herein, the wireless network 100 is scalable according to the defined cell units, nodes, and device roles. In one embodiment, the wireless network 100 includes: a first pico-cell unit that includes a first dwelling unit served by the gateway device 116 of the BSN 106; a second pico-cell unit that includes a second dwelling unit served by the gateway device 124 of the RLN 108; a first nano-cell unit that includes the first pico-cell unit and the second pico-cell unit, which are both served by the base station device 114 of the BSN 106. The wireless network 100 can further include a second nano-cell unit that is coupled to the first nano-cell unit via a link. The second nano-cell unit can include at least a third pico-cell unit having a third dwelling unit served by a third gateway device of a second base station node (not illustrated in FIG. 1). The wireless network 100 further includes a micro-cell unit that includes the first nano-cell unit and the second nano-cell unit.

Aspects of the present disclosure can provide scalability of the wireless network 100 by adding cell units according to the hierarchical architectures described herein, including pico-cell units, nano-cell units, and micro-cell units, and by deploying the wireless devices at the various nodes and programmed according to the device roles. It should also be noted that using the primary wireless network device that is manufactured according to a common device type, can reduce the cost and ease of software development, flexibility in the deployment layout, and the ability to repurpose the wireless network device within the wireless network over time. In some embodiments, a set of well-defined nodes and device roles can allow any wireless network device to self-recognize, self-reconfigure and automatic form complex network topologies, such as the wireless network 100 illustrated in FIG. 1, without any manual intervention or configuration. Alternatively, an operator can manually define, configure, and provide the wireless network devices according to the set of well-defined nodes and device roles. It should also be noted that the network devices could be repurposed to other roles to maximize reusability and reduce cost of the deployment. For example, one of the network devices that is initially used as a gateway device at a Base Station Node can be deployed in other parts of the wireless network 100 or another network, and the network device can be repurposed according to another device role, such as BS role at a BSN, a NAS role at a BSN or RLN, a RL role at a RLN, a customer STA role at a CPE node, or the like.

Figure 2:
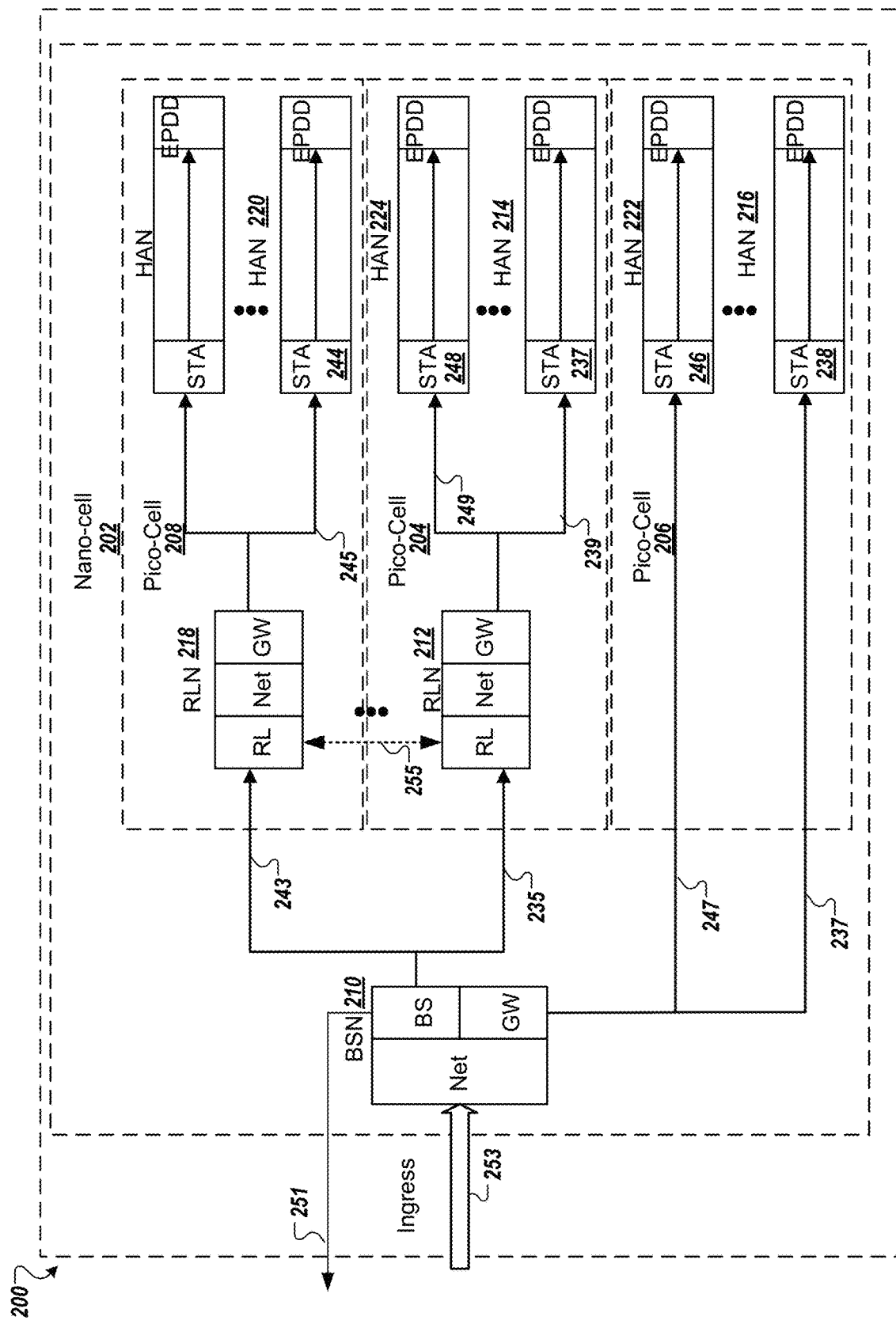
FIG. 2 is a network diagram of a portion of a wireless network that is logically organized into the following hierarchical units: cells, nodes, and devices according to one embodiment.

FIG. 2 is a network diagram of a portion of a wireless network 200 that is logically organized into the following hierarchical units: cells, nodes, and devices according to one embodiment. The portion of the wireless network 200 includes a first nano-cell unit 202, having a first pico-cell unit 204, a second pico-cell unit 206, and a third pico-cell unit 208. The first nano-cell unit 202 includes a BSN 210, a first RLN 212, a second RLN 218, and multiple HANs. The BSN 210 is a first-tier hub of a cascaded star topology. The BSN 210 includes a base station device 230, a gateway device 232, and a first network switch 231 coupled between the base station device 230 and the gateway device 232. The base station device 230, the gateway device 232, and the first network switch 231 are physically organized at a same location, such as on a first dwelling unit. The first RLN 212 is a second-tier hub of the cascaded star topology. The first RLN 212 includes a relay device 234, a gateway device 236, and a second network switch 233 coupled between the relay device 234 and the gateway device 236. The first RLN 212 is part of the first pico-cell unit 204. The relay device 234, gateway device 236, and second network switch 233 are physically organized at a same location, such as on a second dwelling unit. The first RLN 212 is part of the first pico-cell unit 204, whereas the BSN 210 is part of the second pico-cell unit 206. In addition, the first pico-cell unit 204 includes HAN 214 (also referred to as CPE node) and the second pico-cell unit 206 includes HAN 216. The HAN 214 includes a customer station 237. The HAN 214 is a first client of the second-tier hub (e.g., first RLN 212). The HAN 216 includes a customer station 238. The HAN 216 is a first client of the first-tier hub (e.g., BSN 210), whereas the RLN 212 is a second client of the first-tier hub). In one embodiment, the base station device 230, the gateway device 232, the relay device 234, the gateway device 236, the customer station 237, and the customer station 238 are manufactured as a common device type. The base station device 230 is configured to operate as a BS and communicate with (e.g., send data to and receive data from) the relay device 234 over a first wireless link 235. The gateway device 232 is configured to operate as a GW and communicate with the customer station 238 over a second wireless link 237. The relay device 234 is configured to operate as a RL and communicate with the base station device 230 over the first wireless link 235. The gateway device 236 is configured to operate as the GW and communicate with the customer station 237 over a third wireless link 239. The customer station 237 is configured to operate as a customer STA and communicate with the gateway device 236 over the third wireless link 239. The customer station 238 is configured to operate as the customer STA and communicate with gateway device 232 over the second wireless link 237.

The second RLN 218 includes a relay device 240, a gateway device 242, and a third network switch 241 coupled between the relay device 240 and the gateway device 242. The second RLN 218 can be another second-tier hub of the cascaded star topology and the second RLN 218 can be a third client of the first-tier hub (e.g., BSN 210). HAN 220 includes a customer station 244. The HAN 220 is a first client of the other second-tier hub (e.g., RLN 218). The second RLN 218 is a third client of the first-tier hub (e.g., BSN 210). In one embodiment, the relay device 240, the gateway device 242, and the customer station 244 are manufactured as the common device type (i.e., include the identical hardware). The relay device 240 is configured to operate as the relay and communicate with the base station device 230 over a fourth wireless link 243. The gateway device 242 is configured to operate as the GW and communicate with the customer station 244 over a fifth wireless link 245. The customer station 244 is configured to operate as the customer STA and communicate with the gateway device 242 over the fifth wireless link 245.

It should be noted that the RLN 218 could be considered a second-tier hub if there were an intervening RLN between RLN 218 and the BSN 210. That is, the RLN 218 can establish another wireless link between one or more RLNs back to the BSN 210. For example, the RLN 218 can establish a wireless link 255 with the RLN 212 to connect to the BSN 210, instead of over the fourth wireless link 243. Also, the RLN 218 (or the RLN 212) can be third-tier hubs if there were more than one intervening RLNs between the respective RLN and the BSN 210.

As illustrated in FIG. 2, the BSN 210 and the HAN 216 are physically organized as part of the second pico-cell unit 206 and the first RLN 212, the HAN 214 are physically organized as part of the first pico-cell unit 204, and the second RLN 218 and the HAN 220 are physically organized as part of the third pico-cell unit 208. The first pico-cell unit 204, the second pico-cell unit 206, and the third pico-cell unit 208 are physically organized as part of the first nano-cell unit 202. The pico-cell units can include additional HANs. For example, the second pico-cell unit 206 includes HAN 222, which includes a customer station 246. The customer station 246 is a fourth client of the first-tier hub. The customer station 246 can be manufactured as the common device type and be configured to operate as the customer STA role and communicate with the gateway device 232 over a sixth wireless link 247. For another example, the first pico-cell unit 204 includes HAN 224, which includes a customer station 248. The customer station 248 is a second client of the second-tier hub (e.g., first RLN 212). The customer station 248 can be manufactured as the common device type and can be configured to operate as the customer STA role and communicate with the gateway device 236 over a seventh wireless link 249. Similarly, the third pico-cell unit 208 can include an additional HAN as additional clients of the second RLN 218.

Although not illustrated in FIG. 2, the wireless network 200 can include a ninth node with a twelfth device, a thirteenth device, and a fourth network switch coupled between the twelfth device and the thirteenth device. The ninth node can be another first-tier hub of the cascaded star topology. The twelfth device and the thirteenth device can be manufactured as the common device type. The twelfth device can be configured to operate as the BS and communicate with the base station device 230 over a wired or wireless link 251. In addition, the twelfth device can be configured to communicate with one or more additional RLNs over one or more wireless links. The thirteenth device can be configured to operate as the GW and communicate with one or more customer stations over an additional wireless link. The ninth node, the one or more additional RLNs, and one or more customer station can be part of a second nano-cell unit (not illustrated in FIG. 2) that is coupled to the first nano-cell unit 202 via the wireless link 251. The second nano-cell unit and the first nano-cell unit 202 can be physically organized as part of a micro-cell unit. The base station device 230 is also configured to connect to an Internet Service Provider (ISP) ingress 253 via a router device (not illustrated in FIG. 2). The router device can be located at the same location as the BSN 210 and can be considered part of the BSN 210. The router device can connect to the base station device 230 via the first network switch 231. Alternatively, the base station device 230 can be connected to the router device in other manners and the router device can be located at a different location than the BSN 210.

In one embodiment, all devices of the first pico-cell unit 204 can be disposed on or within a first multi-dwelling unit (MDU) and all devices of the second pico-cell unit 206 are disposed on or within a second MDU. Similarly, all devices of the third pico-cell unit 208 can be disposed on or within a third MDU. The first nano-cell unit 202 can include seven MDUs, including the first MDU, the second MDU, and the third MDU. Each pico-cell unit of the first nano-cell unit 202 can service multiple customers (e.g., 28 customers) of a single building (e.g., 10-floor building). The first nano-cell unit 202 can service various customers at multiple customer premises with multiple MDUs, for example, approximately 196 customers within 7 buildings within a 100 m radius. It should be noted that other embodiments, more or less than seven MDUs can be used. However, seven buildings per MDU-based nano-cell unit can support 200-300 customers within 600 Mbps capacity and 100 m radius, depending on service type (VoD, ISP) and contention ratios.

In another embodiment, all devices of the BSN 210 are disposed on a first structure and all devices of the HAN 216 are disposed on or within a first single dwelling unit (SDU). All devices of the HAN 222 can be disposed on or within a second SDU. The second pico-cell unit 206 can include multiple SDUs within a specified radius (e.g., 75 m radius) to service multiple customers (e.g., 68 customers). The first nano-cell unit 202 can service various customers at multiple customer premises (SDUs), for example, approximately 476 customers within 7 buildings (SDU) within a 150 m radius. In one embodiment, the BSN 210 is disposed on a first structure that is higher than the SDUs, such as a tower or a building. The first RLN 212 can also be disposed on a second structure that is higher than surrounding SDUs. Similarly, the second RLN 218 can be disposed on a third structure that is higher than surrounding SDUs. Alternatively, the RLNs can be disposed on one of the SDUs and serve surrounding HANs on the respective SDUs.

In another embodiment, the first device, the second device, and the first network switch of the first node are disposed on a roof of a first building and the sixth device of the fourth node is disposed on or within a first SDU that is in proximity to the first building. The third device, the fourth device, and the second network switch of the second node are disposed on a roof of a second building and the fifth device of the third node is disposed on or within a second SDU that is in proximity to the second building. The twelfth device, the thirteenth device, and the fourth network switch of the ninth node are disposed on a roof of a third building. In one embodiment, the first nano-cell unit includes the first building and the second building and the first pico-cell unit includes a first set of SDUs, including the first SDU, the first set of SDUs being in proximity to the first building. The second pico-cell unit includes a second set of SDUs, including the second SDU, the second set of SDUs being in proximity to the second building.

In another embodiment, the first device, the second device, and the first network switch of the first node are disposed on a roof of a first building and the sixth device of the fourth node is disposed on or within a second building that is in proximity to the first building. The third device, the fourth device, and the second network switch of the second node are disposed on a roof of a third building and the fifth device of the third node is disposed on or within a fourth building that is in proximity to the third building. The twelfth device, the thirteenth device, and the fourth network switch of the ninth node are disposed on a roof of a fourth building. In one embodiment, the first nano-cell unit includes the first building and the third building and the first pico-cell unit includes a first set of buildings, including the second building, the first set of buildings being in proximity to the first building. The second pico-cell unit includes a second set of buildings, including the fourth building, the second set of buildings being in proximity to the fourth building. Additional details regarding the MDUs and SDUs are set forth below with respect to FIGS. 3-6C.

Figure 3:
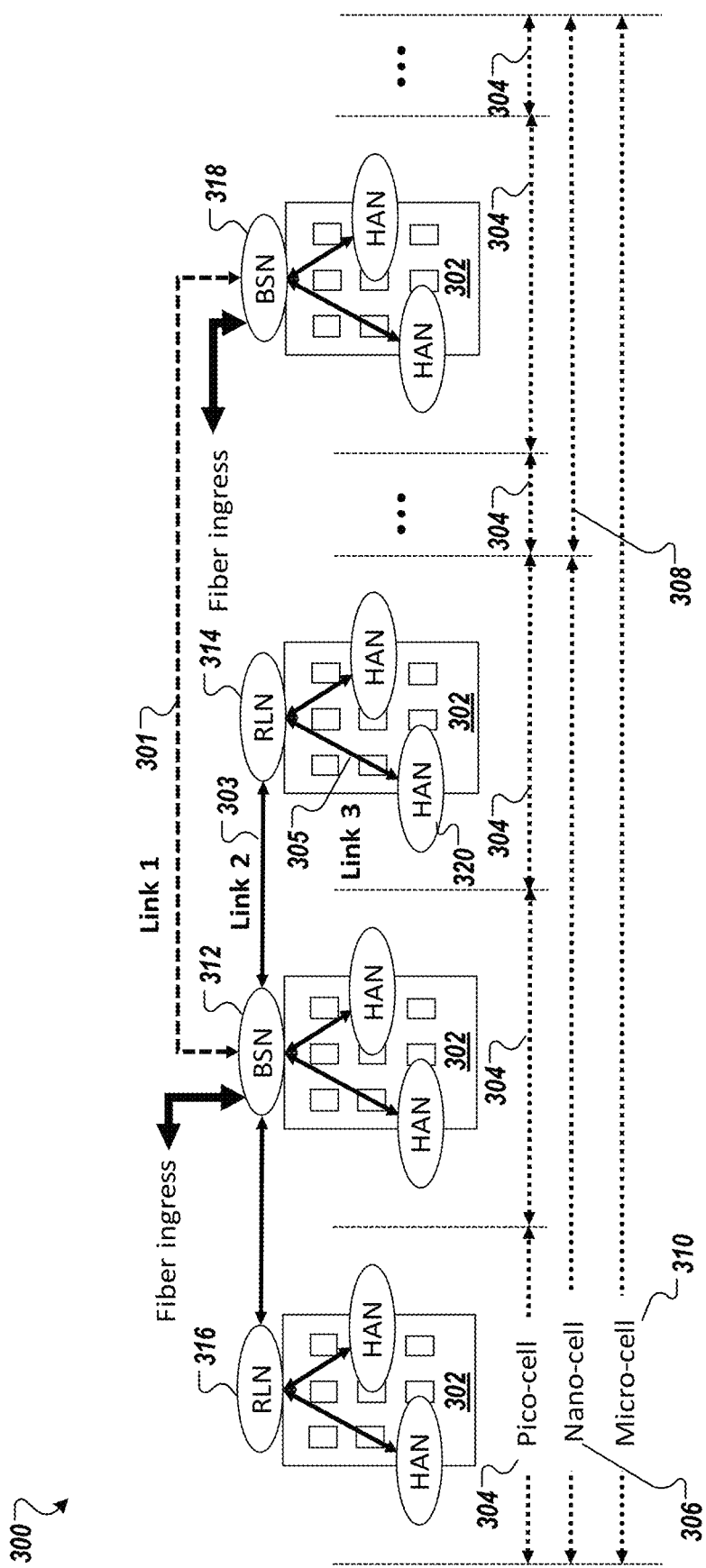
FIG. 3 is a network diagram of a portion of a wireless network with multi-dwelling units (MDUs) as a first housing society type according to one embodiment.

FIG. 3 is a network diagram of a portion of a wireless network 300 with multi-dwelling units (MDUs) 302 as a first housing society type according to one embodiment. Each MDU can include four or more dwellings per building. Each MDU 302 can be part of a single pico-cell unit 304. Some of the MDUs 302 can be part of a first nano-cell unit 306 and other MDUs 302 can be part of one or more additional nano-cell units 308 within a micro-cell unit 310, as described herein. A first BSN 312 is disposed on a first MDU, a first RLN 314 is disposed on a second MDU, and a second RLN 316 is disposed on a third MDU. A second BSN 318 can be disposed on another MDU in another nano-cell unit 308 within the micro-cell unit 310. The first BSN 312 is coupled to a fiber ingress of the ISP. The first BSN 312 is communicatively coupled to the second BSN 318 via a first link 301. The second BSN 318 can be coupled to another fiber ingress of the ISP. The first BSN 312 is communicatively coupled to the first RLN 314 via a second link 303. The first RLN 314 is communicatively coupled to a first HAN 320 via a third link 305. The first RLN 314 can be communicatively coupled to other HANs in the pico-cell unit 304. The first BSN 312 is also communicatively coupled to the second RLN 316 via a fourth link. The second RLN 316 is communicatively coupled to one or more HANs in the respective pico-cell unit 304.

Figure 4:
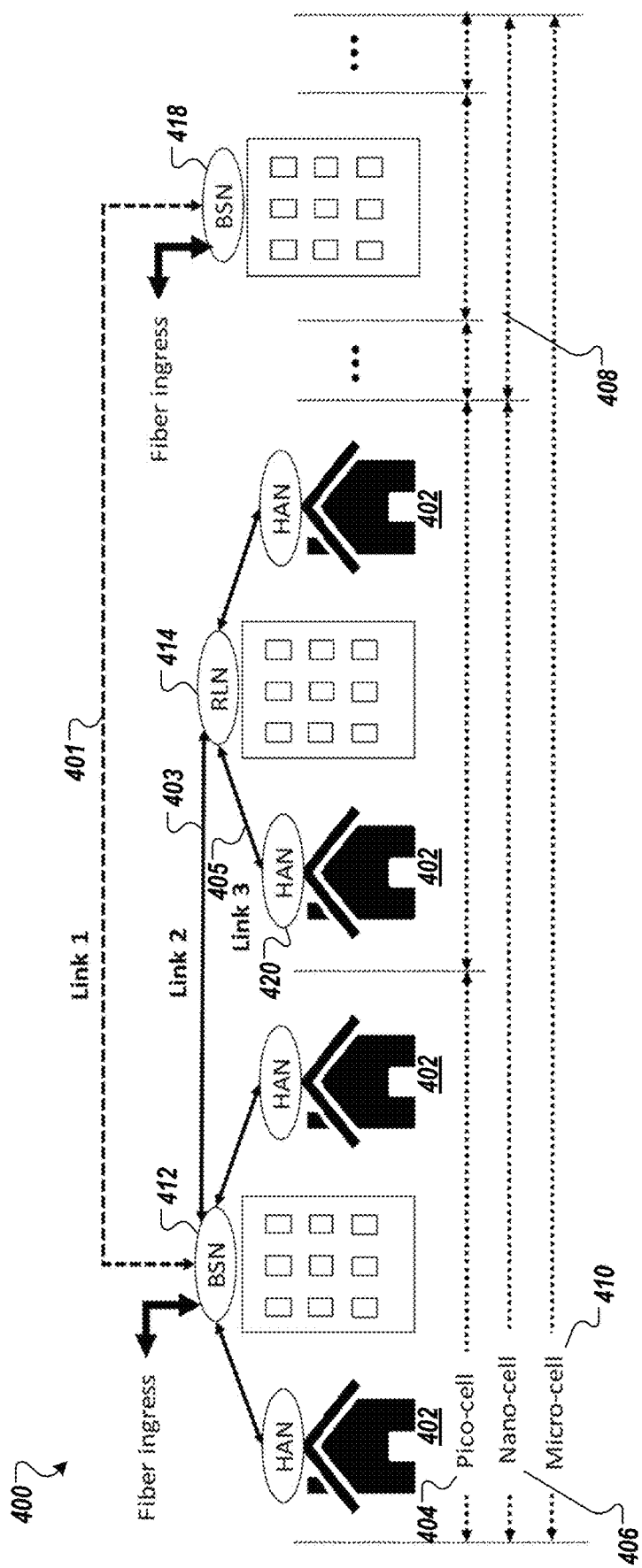
FIG. 4 is a network diagram of a portion of a wireless network in with multiple single dwelling units (SDUs) as a second housing society type according to one embodiment.

FIG. 4 is a network diagram of a portion of a wireless network 400 in with multiple single dwelling units (SDUs) 402 as a second housing society type according to one embodiment. Multiple SDUs 402 can be part of a single pico-cell unit 404. Some of the SDUs 402 can be part of a first nano-cell unit 406 and other SDUs 402 can be part of one or more additional nano-cell units 408 within a micro-cell unit 410, as described herein. A first BSN 412 is disposed on a first structure within a first pico-cell unit 404 and a first RLN 414 is disposed on a second structure within a second pico-cell unit 404. A second BSN 418 can be disposed on a third structure within another pico-cell unit 404 of another nano-cell unit 408 within the micro-cell unit 410. The first BSN 412 is coupled to a fiber ingress of the ISP. The first BSN 412 is communicatively coupled to the second BSN 418 via a first link 401. The second BSN 418 can be coupled to another fiber ingress of the ISP. The first BSN 412 is communicatively coupled to the first RLN 414 via a second link 403. The first RLN 414 is communicatively coupled to a first HAN 420 via a third link 405. The first RLN 414 can be communicatively coupled to other HANs in the pico-cell unit 404. The first BSN 412 can also communicatively coupled to other RLNs that are each communicatively coupled to one or more HANs in the respective pico-cell unit 304 of the respective RLN.

Figure 5A:
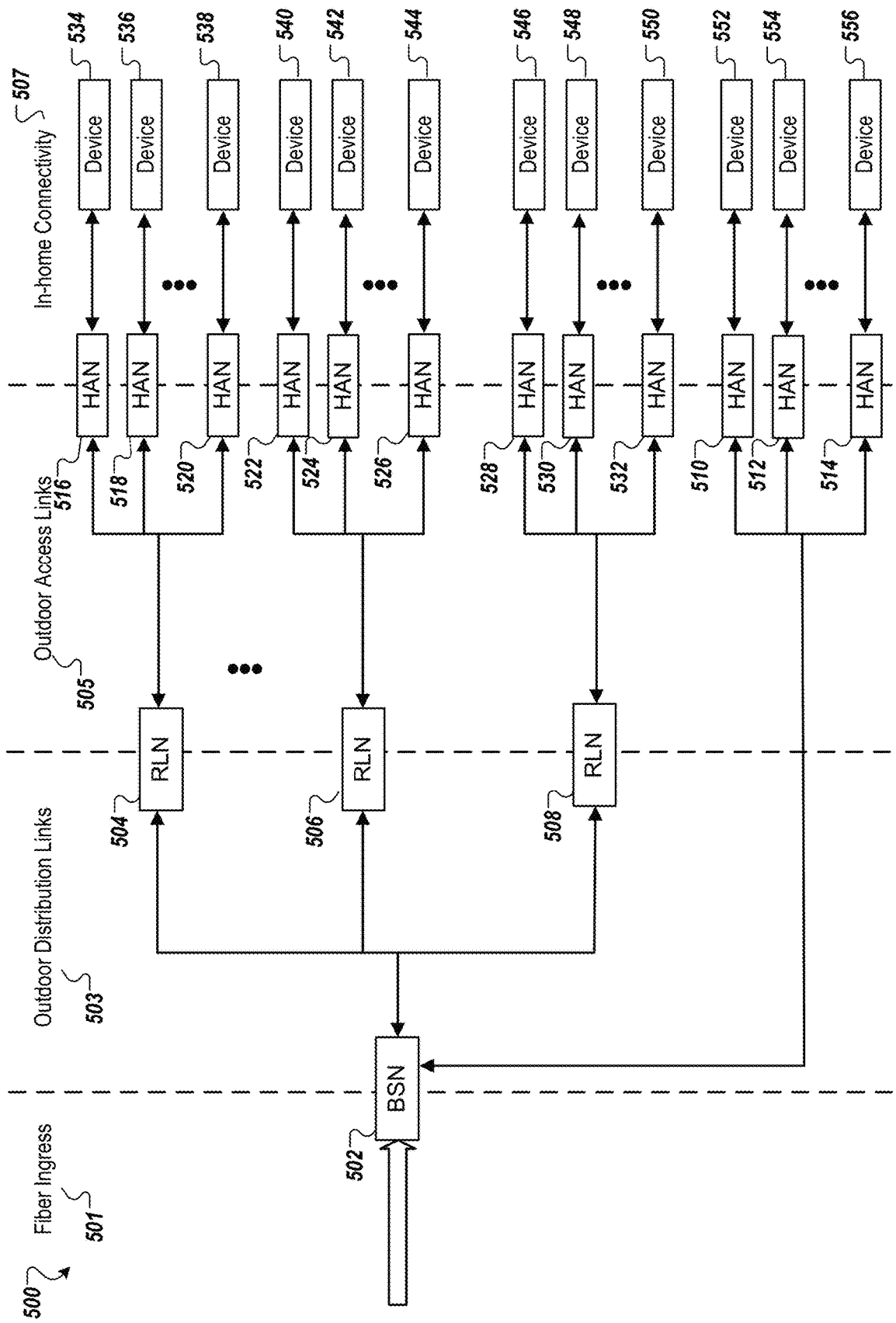
FIG. 5A is a network diagram of a wireless network with the three nodes types in a star topology according to one embodiment.

FIG. 5A is a network diagram of a wireless network 500 with the three nodes types in a star topology according to one embodiment. The wireless network 500 is a network architecture to deliver both video on demand (VoD) and internet to customers in limited-infrastructure regions, such as India. An ingress 501 can be a high capacity ingress (typically fiber exchange) and a means of distribution to the customer using wired and wireless links. The network devices within the network are organized into three logical units known as nodes: BSNs, RLNs, and HANs. Wireless network 500 includes a BSN 502 that has a fiber ingress 501 and uses outdoor distribution links 503 to communicate with RLNs 504, 506, 508. The BSN 502 also uses outdoor access links 505 to communicate with HANs 510, 512, 514. The RLNs 504, 506, 508 use outdoor access links 505 to communicate with HANs 516-532. The HANs 510-532 use in-home connectivity 507 to communicate with devices 534-556. Each node supports a unique set of network functions. The HAN provides connectivity for in-home customer devices (e.g., Fire TV, laptop, or the like) to the outdoor wireless access network (e.g., 505). RLNs aggregate the HAN wireless access traffic and pass this data back to a central BSN 502 over a wireless distribution network (e.g., 503). BSNs aggregate both the RLN wireless distribution and local wireless access traffic. The BSN 502 can also include a fiber ingress point (e.g., ingress 501).

Table 2 includes some example parameters of the settings for different device roles within the BSN.

TABLE 2

| Base Station Node (BSN) | | | | |
|---|---|---|---|---|
| Base Station (BS) Radios device | Number | | 3 | Number of radios per device. This can be implemented in different ways (i.e. 2 versus 3). |
| Frequency | | | 5.x GHz | 5.x GHz high band operation (U-NII-3, ext) with filter. |
| Capacity | | | 200 Mbps | Maximum TCP capacity per sector. |
| Protocol | | | 802.11n/ac | CSMA-CA or TDMA capable of 2X2 MIMO using 20/40 MHz channel bandwidths. |
| Antenna | Number | | 3 | Number of antenna sectors per device. |
| Type | | | Dual-pol | 2-port antenna supporting V/H polarization modes. |
| AZ Beamwidth | | | 90 deg | Azimuthal beamwidth per sector at −3 dB with respect to the beam peak. |
| EL Beamwidth | | | 10 deg | Elevation beamwidth per sector at −3 dB with respect to the beam peak. |
| Antenna Gain | | | 13 dBi | Minimum BS sector antenna gain |
| Intra-Isolation | | | 15 dB | Port to port isolation between antennas connected to same radio. |
| Inter-Isolation | | | 60 dB | Port to port isolation between antennas connected to different radios. |
| Gateway (GW) Radios device | Number | | 2 | Minimum number of GW radios needed to provide wireless access to HAN STA radios. |
| Frequency | | | 5.x GHz | 5.x GHz low band operation (U-NII-3, ext) with filter. |
| Capacity | | | 200 Mbps | Maximum TCP capacity per sector. |
| Protocol | | | 802.11n/ac | CSMA-CA or TDMA capable of 2X2 MIMO using 20/40 MHz channel bandwidths. |
| Antenna | Number | | 2 | Number of antenna sectors per device. |
| Type | | | Dual-pol | 2-port antenna supporting V/H polarization modes. |
| AZ Beamwidth | | | 120 deg | Azimuthal beamwidth per sector at −6 dB with respect to the beam peak. |
| EL Beamwidth | | | 10 deg | Elevation beamwidth per sector at −3 dB with respect to the beam peak. |
| Antenna Gain | | | 13 dBi | Minimum BS sector antenna gain |
| Intra-Isolation | | | 15 dB | Port to port isolation between antennas connected to MIMO ports on the same radio. |
| Inter-Isolation | | | 60 dB | Port to port isolation between antennas connected to collocated radios. |
| BS/GW Inter-Isolation | | | 25 dB | Antenna port to port isolation between BS and GW devices |

TABLE 2-continued

| Base Station Node (BSN) | | |
|---|---|---|
| Storage | NAS Drive | Minimum storage size/Minimum storage data transfer speed |
| Power Supply | PoE | 25.5 W - Power over Ethernet for all BS/GW devices |
| Fiber Ingress | Connector Type | SFP - small form factor pluggable (SFP) optical fiber port for fiber ingress |
| | Speed | 1 Gbps - minimum ingress capacity |

Table 3 includes some example parameters of the settings for different device roles within the RLN.

TABLE 3

| Relay Node (RLN) RLN | | | | |
|---|---|---|---|---|
| Relay (RL) Radios | Number | | 1 | Number of radios per device. |
| Frequency | | | 5.x GHz | 5.x GHz high band operation (U-NII-3, ext) with filter. |
| Capacity | | | 200 Mbps | Maximum TCP capacity per sector. |
| Protocol | | | 802.11n/ac | CSMA-CA or TDMA capable of 2X2 MIMO using 20/40 MHz channel bandwidths. |
| Antenna | Number | | 1 | Number of antenna sectors per device. |
| Type | | | Dual-pol | 2-port antenna supporting V/H polarization modes. |
| AZ Beamwidth | | | 10 deg | Azimuthal beamwidth per sector at −3 dB with respect to the beam peak. |
| EL Beamwidth | | | 90 deg | Elevation beamwidth per sector at −3 dB with respect to the beam peak. |
| Antenna Gain | | | 13 dBi | Minimum BS sector antenna gain |
| Intra-Isolation | | | 15 dB | Port to port isolation between antennas connected to same radio. |
| Inter-Isolation | | | 60 dB | Port to port isolation between antennas connected to different radios. |
| Gateway Radios (GW) device | Number | | 2 | Minimum number of GW radios needed to provide wireless access to HAN STA radios. |
| Frequency | | | 5.x GHz | 5.x GHz low band operation (U-NII-3, ext) with filter. |
| Capacity | | | 200 Mbps | Maximum TCP capacity per sector. |
| Protocol | | | 802.11n/ac | CSMA-CA or TDMA capable of 2X2 MIMO using 20/40 MHz channel bandwidths. |
| Antenna | Number | | 2 | Number of antenna sectors per device. |
| Type | | | Dual-pol | 2-port antenna supporting V/H polarization modes. |
| AZ Beamwidth | | | 120 deg | Azimuthal beamwidth per sector at −6 dB with respect to the beam peak. |
| EL Beamwidth | | | 10 deg | Elevation beamwidth per sector at −3 dB with respect to the beam peak. |
| Antenna Gain | | | 13 dBi | Minimum BS sector antenna gain |
| Intra-Isolation | | | 15 dB | Port to port isolation between antennas connected to MIMO ports on the same radio. |
| Inter-Isolation | | | 60 dB | Port to port isolation between antennas connected to collocated radios. |

Table 4 includes some example parameters of the settings for different device roles within the HAN.

TABLE 4

| Home Access Node (HAN) HAN | | | | |
|---|---|---|---|---|
| Station (STA) Radios | Number | | 1 | Number of radios per device. |
| Frequency | | | 5.x GHz | 5.x GHz high band operation (U-NII-3, ext) with filter. |
| Capacity | | | 20 Mbps | Maximum TCP capacity per sector. |
| Protocol | | | 802.11n/ac | CSMA-CA or TDMA capable of 2X2 MIMO using 20/40 MHz channel bandwidths. |

TABLE 4-continued

Home Access Node (HAN)
HAN

| | | | | |
|---|---|---|---|---|
| Antenna | | Number | 1 | Number of antenna sectors per device. |
| Type | | | Dual-pol | 2-port antenna supporting V/H polarization modes. |
| AZ Beamwidth | | | 90 deg | Azimuthal beamwidth per sector at −3 dB with respect to the beam peak. |
| EL Beamwidth | | | 20 deg | Elevation beamwidth per sector at −3 dB with respect to the beam peak. |
| Antenna Gain | | | 10 dBi | Minimum BS sector antenna gain |
| Intra-Isolation | | | 15 dB | Port to port isolation between antennas connected to same radio. |
| Inter-Isolation | | | 60 dB | Port to port isolation between antennas connected to different radios. |
| Indoor AP | Radios | Number | 1 | Minimum number of radios needed to connect to support in-home devices (i.e. Fire TV Stick) |
| Frequency | | | 2.4 GHz | ISM band operation. |
| Capacity | | | 20 Mbps | Maximum TCP capacity per sector. |
| Protocol | | | 802.11n | CSMA-CA or TDMA capable of 2X2 MIMO. |
| Antenna | | Number | 1 | Number of antenna sectors per device. |
| Type | | | Dual-pol omni | 2-port antenna supporting 2X2 MIMO. |
| AZ Beamwidth | | | 360 deg | Azimuthal beamwidth per sector at −3 dB with respect to the beam peak. |
| EL Beamwidth | | | 20 deg | Elevation beamwidth per sector at −3 dB with respect to the beam peak. |
| Antenna Gain | | | 5 dBi | Minimum BS sector antenna gain |
| Intra-Isolation | | | 15 dB | Port to port isolation between antennas connected to MIMO ports on the same radio. |
| Power Supply | Brick | Power Supplied | 36 W | Three pin power brick with 1 ft AC cable and 6 ft DC cable. |

As described above, the wireless network 500 can be logically organized according to the hierarchy illustrated in FIG. 5A. Devices at different portions of the wireless network 500 are organized physically in different building types, such as illustrated in FIGS. 5B-5C.

Figure 5B:
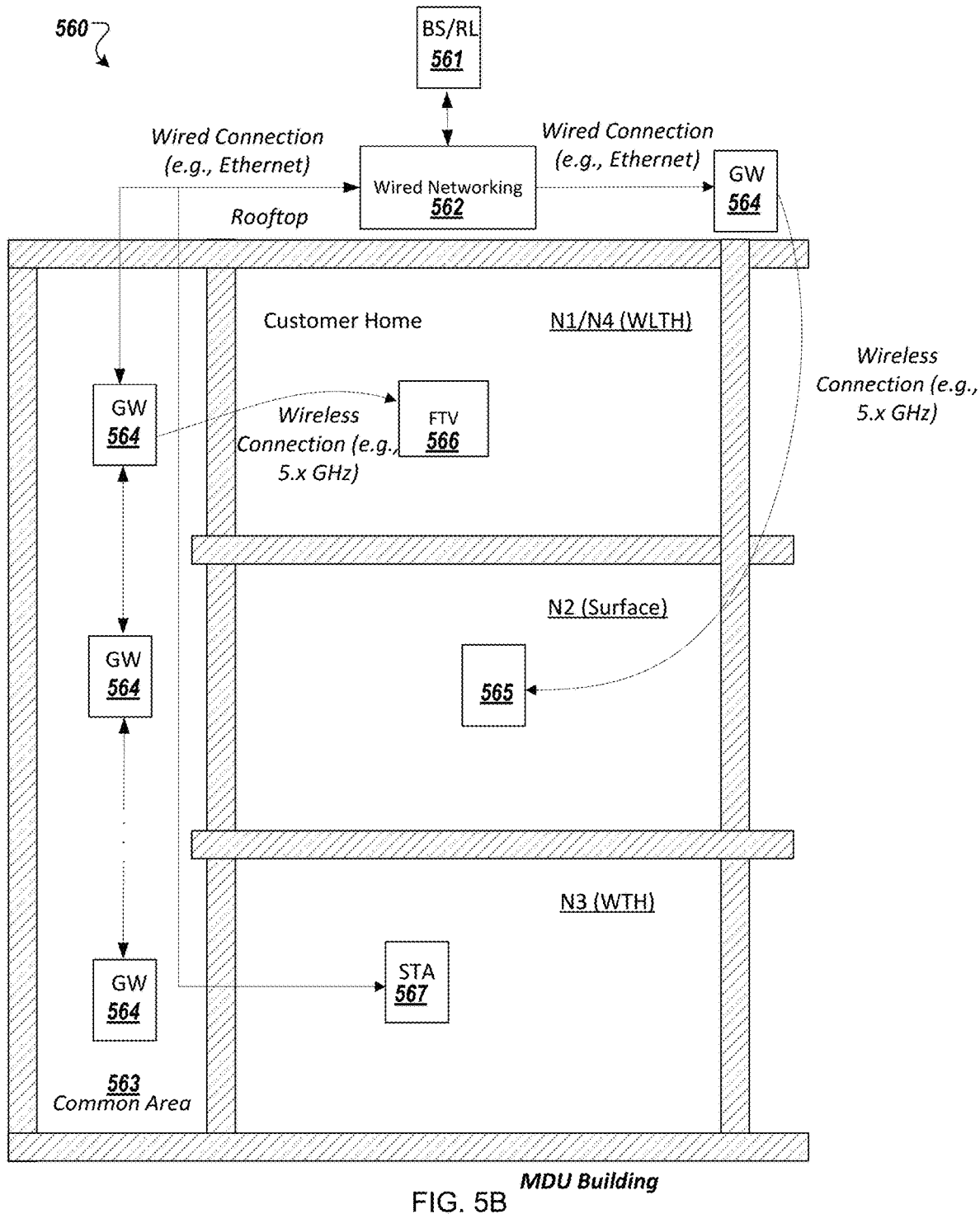
FIG. 5B is a network diagram of network devices deployed at a MDU according to another embodiment.

FIG. 5B is a network diagram of network devices deployed at a MDU 560 according to one embodiment. At the MDU 560, there is either a base station (BS) device or a relay (RL) device, hereinafter referred to as a BS/RL device 561, disposed on a roof of the MDU 560. The BS/RL device 561 is coupled to wired networking 562. The wired networking 562 can include a Power-over-Ethernet (PoE) switch, a NAS storage device, or the like. The BS/RL connectivity can be through the connectivity of a nano-cell unit, and the devices below the BS/RL device 561 are part of a pico-cell unit. The pico-cell unit can be sub-divided by customer device connectivity (GW-STA, or GW-endpoint). The wired networking 562 can extend along the roof of the MDU 560, as well as in common areas 563 of the MDU 560. The wired networking 562 can connect the BS/RL device 561 to one or more gateway devices 564 in the common areas 563, as well as one or more gateway devices 564 on the roof. The gateway devices 564 can be connected to one another via wired or wireless connections. The gateway devices 564 can connect to CPE within a customer's home over wired connections or wireless connections (e.g., 5.x GHz) in various manners, referred to herein as MDU options: N1-N4. For example, the gateway device 564 on the roof can wireless connect to a customer station 565 along a surface of the MDU 560 (referred to as N2 network (surface)). The customer station 565 can operate as an access point to other endpoint devices within the customer premises, such as a tablet, a phone, an entertainment device, or the like. The access point can communicate with these devices over the 2.4 GHz frequency band. The customer station 565 can include an antenna (e.g., a surface antenna or external directional antenna) that is mounted external to the customer premises to communicate with the gateway device 564 on the roof along a surface of the MDU 560. The gateway device 564 can include a surface antenna (or external directional antenna) through which it communicates with the customer station 565 along the surface of the MDU 560. A gateway device 564 in the common area 563 can wirelessly connect to an endpoint device 566 (e.g., FireTV device) (referred to herein as N1/N4 network (WLTH)). Another gateway device 564 in the common area 563 can connect to a customer station 567 over a wired connection within the MDU 560 (referred to herein as N3 network (WTH)).

Figure 5C:
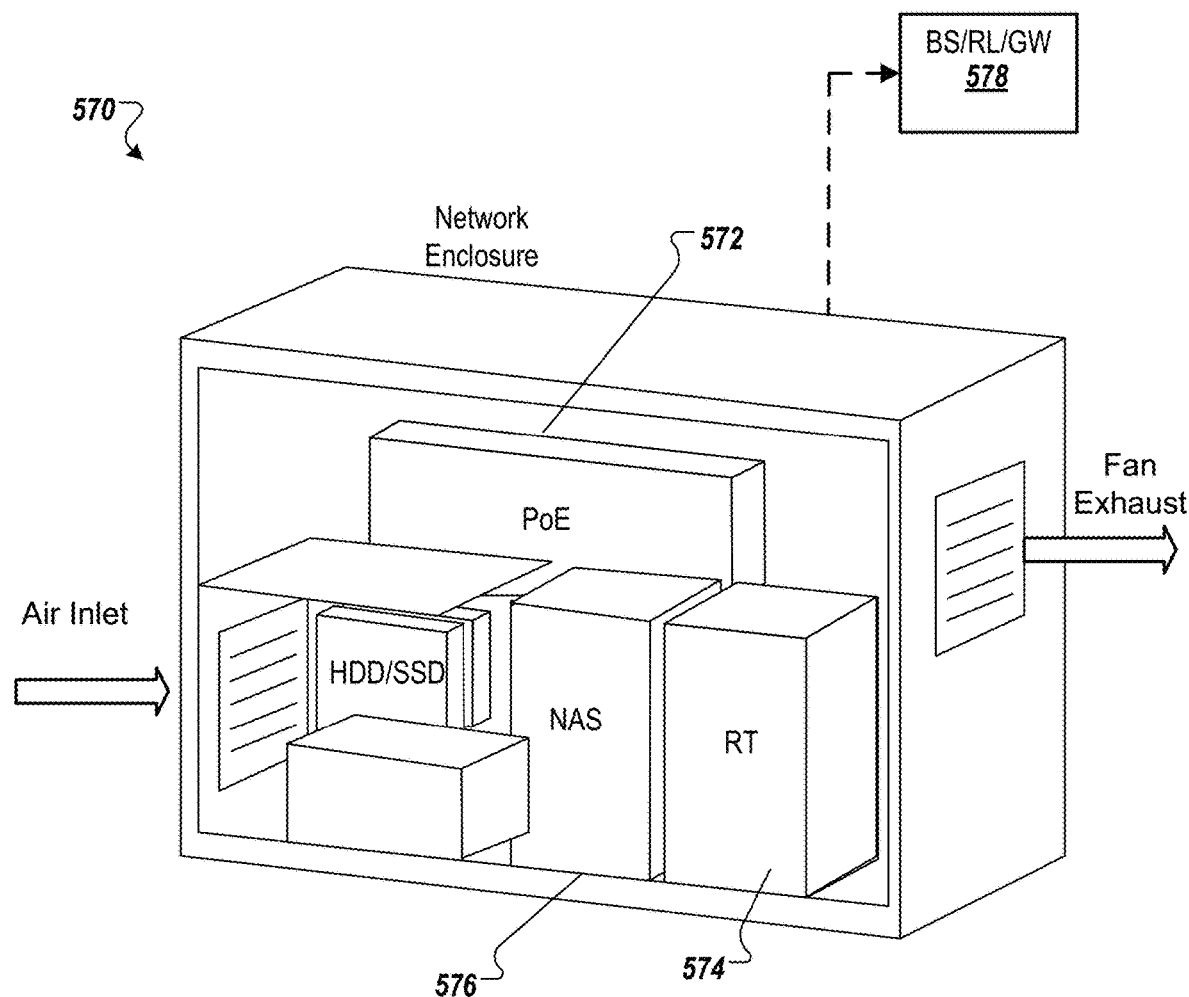
FIG. 5C illustrates a housing with a multiple devices of a base station node (BSN) according to one embodiment.

FIG. 5C illustrates a housing 570 with a multiple devices of a base station node (BSN) according to one embodiment. The housing 570 include a PoE network switch 572, a router device 574 (RT) that serves as ingress into a pico-cell unit, and a storage device 576 (NAS) coupled to one or more storage mediums (e.g., HDD, SSD) 578. The PoE network switch 572 coupled the router device 574 and the storage device 576 to operate as the BSN. The router device 574 can provide layer 3 (L3) routing functions for communications within a nano-cell unit. The router device 574 can provide a network address translation (NAT) service for devices in the pico-cell unit. The router device 574 (or a separate device) can also be configured as a base station device that can provide a multi-sector, 360-degree PtMP coverage to relay devices up to 100 m range. The housing 570 can be disposed on a MDU or other structure, such as on a roof of a building. It should be noted that a RLN includes a similar housing with the PoE network switch, a relay device, a gateway device, and an optional storage device. The housing of the RLN can also be disposed on a separate MDU or other structure. In another embodiment, the router device 574 can be connected to one or more devices 578 via the PoE network switch 572. The one or more devices 578 can be a base station device, a relay device, a gateway device, or any combination thereof. The one or more devices 578 can be disposed on the same roof or a different roof than the housing 570. These one or more devices can also be disposed in a single or multiple housings or enclosures.

Figure 6A:
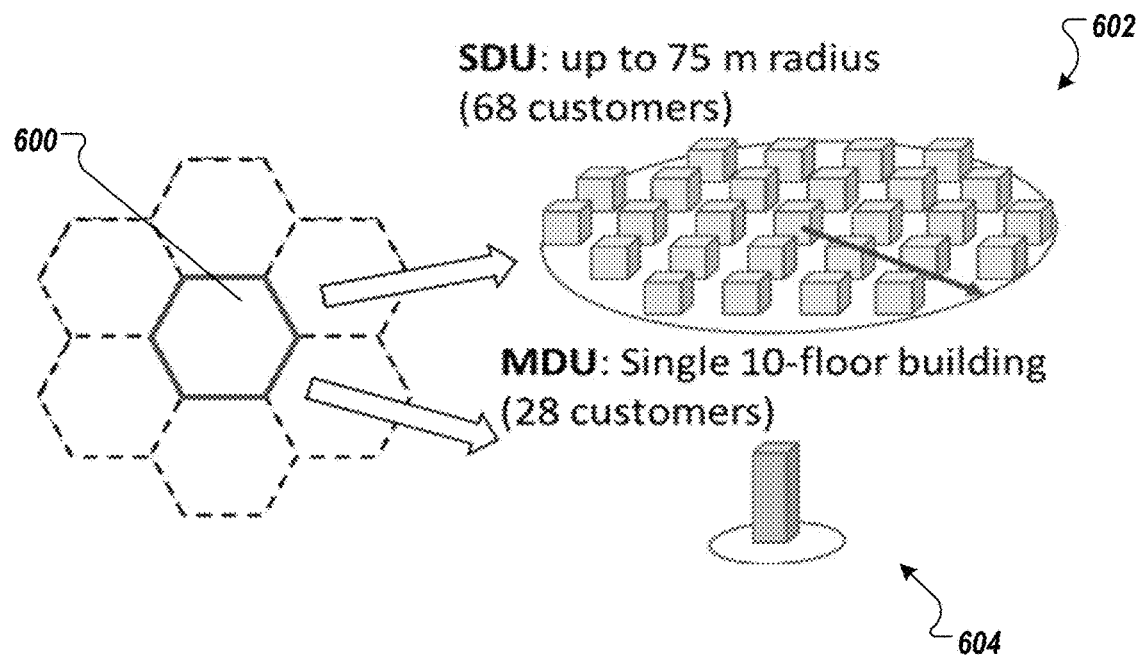
FIG. 6A illustrates a single pico-cell unit with either multiple SDUs or a single MDU according to one embodiment.

FIG. 6A illustrates a single pico-cell unit 600 with either multiple SDUs 602 or a single MDU 604 according to one embodiment. The single pico-cell unit 600 can be one of multiple pico-cell units of a nano-cell unit 620 (illustrated in FIG. 6B). In one implementation, all devices of the single pico-cell unit 600 can be disposed over multiple SDUs 602. For example, the BSN can be disposed on a first structure and the HANs can be disposed on the individual SDUs. RLN can also be disposed on other structures within the single pico-cell unit 600. In another implementation, all devices of the single pico-cell unit 600 can be disposed on or within the single MDU 604. The single pico-cell unit 600 can include multiple SDUs within a specified radius (e.g., 75 m radius) to service multiple customers (e.g., 68 customers). The single pico-cell unit 600 with one single MDU can service multiple customers (e.g., 28 customers).

Figure 6B:
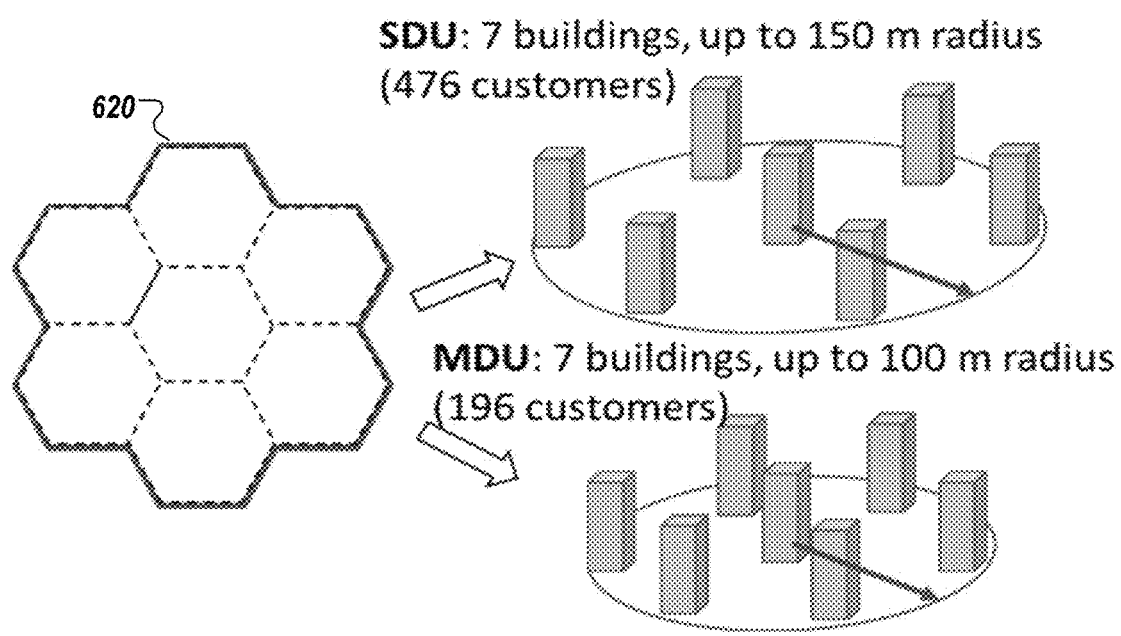
FIG. 6B illustrates a single nano-cell unit with either multiple SDUs or multiple MDUs according to one embodiment.

FIG. 6B illustrates a single nano-cell unit 620 with either multiple SDUs 622 or multiple MDUs 624 according to one embodiment. The single nano-cell unit 620 can be one of multiple nano-cell units of a micro-cell unit (illustrated in FIG. 6C). In one implementation, all devices of the single nano-cell unit 620 can be disposed over multiple sets, each set having multiple SDUs 622. For example, seven buildings can be used within the single nano-cell unit 620 to service customers (e.g., 476 customers) up to 150 m radius. Each pico-cell of the single nano-cell unit 620 can include a BSN and one or more RLNs disposed on structures, whereas the HANs can be disposed on the individual SDUs 622. In another implementation, all devices of the single nano-cell unit 620 can be disposed on or within multiple MDU 624. The single nano-cell unit 620 can include multiple MDUs within a specified radius (e.g., 100 m radius) to service multiple customers (e.g., 196 customers).

Figure 6C:
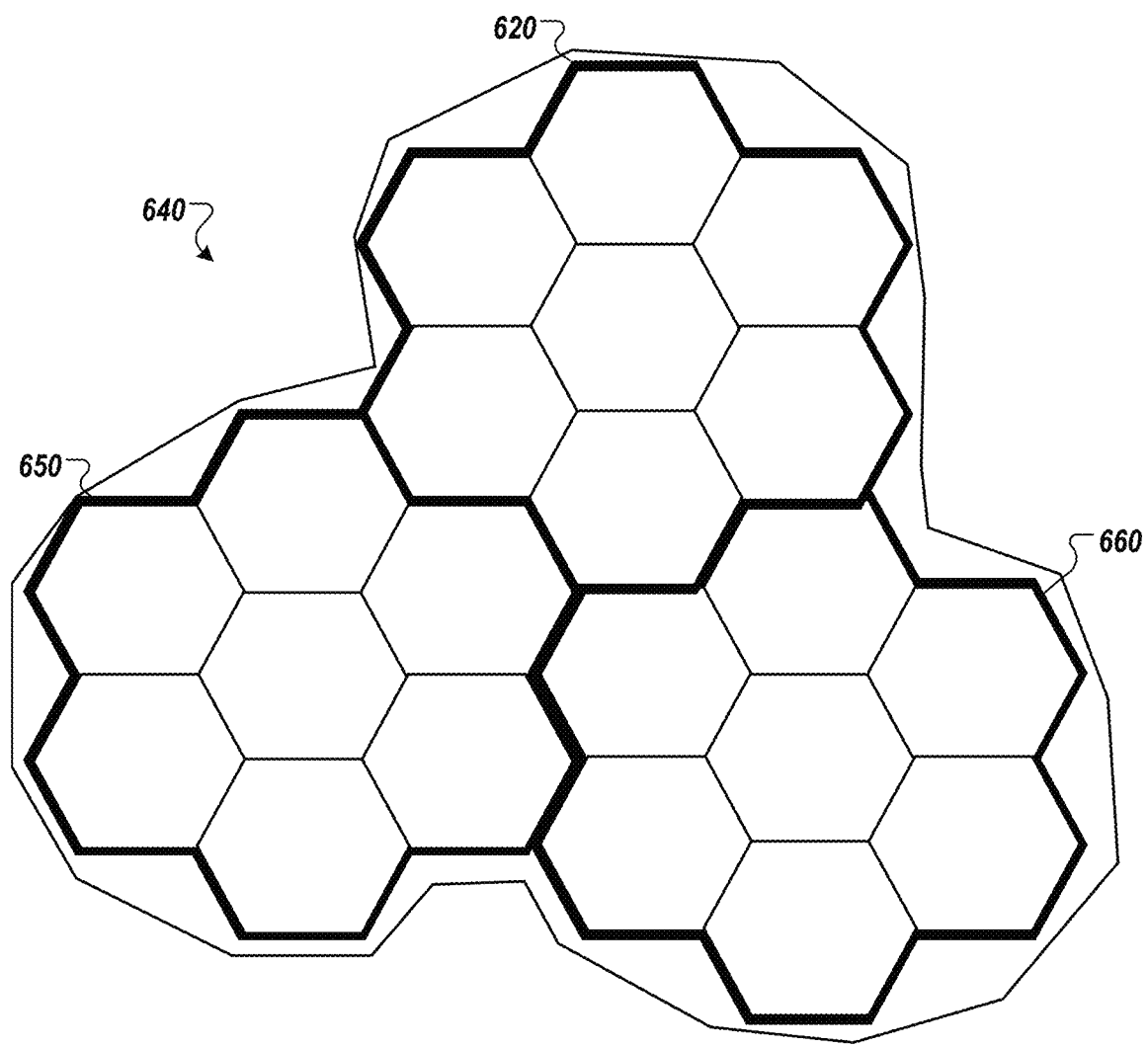
FIG. 6C illustrates a single micro-cell unit with either SDUs or MDUs according to one embodiment.

FIG. 6C illustrates a single micro-cell unit 640 with either SDUs or MDUs according to one embodiment. The single micro-cell unit 640 includes the nano-cell unit 620 of FIG. 6B, as well as a second nano-cell unit 650 and a third nano-cell unit 660. The single micro-cell unit 640 can include additional nano-cell units. Each of the nano-cell units of the single micro-cell unit 640 can include SDUs or MDUs as described above with respect to FIGS. 6A-6B.

Each cell type can be further sectorized in order to increase network capacity while managing in-network interface. When there is no ability to synchronize transmission and reception windows in the wireless network, such as for Wi-Fi® based networks using Carrier-sense multiple access with collision avoidance (CSMA-CA), sectorization of the pico-cell and nano-cell units can increase network capacity and manage in-network interference, such as set forth in the pico-cell sectorization illustrated and described with respect to FIG. 7 and the nano-cell sectorization illustrated and described with respect to FIG. 8.

Figure 7:
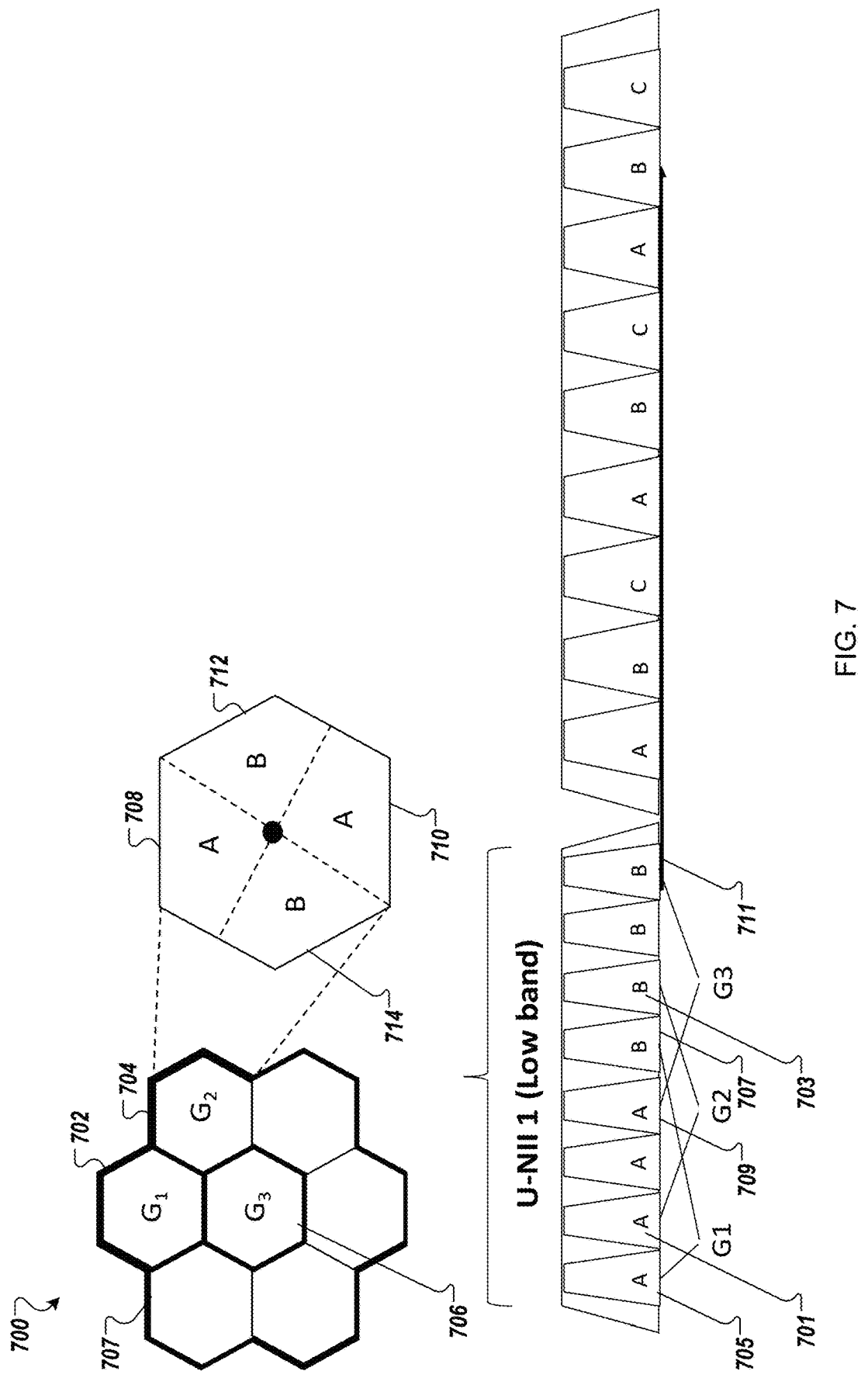
FIG. 7 illustrates pico-cell sectorization of multiple pico-cell units of a nano-cell unit according to one embodiment.

FIG. 7 illustrates pico-cell sectorization 700 of multiple pico-cell units 702-706 of a nano-cell unit 707 according to one embodiment. As illustrated, the second pico-cell unit 704 is a sectorized pico-cell unit in which non-adjacent channels of a first frequency band are assigned to four geographical sectors in an alternating configuration (e.g., ABAB configuration). In particular, a first geographical sector 708 and a second geographical sector 710 of the second pico-cell unit 704 are assigned a first channel 701 of a first frequency band (e.g., U-NII-1 (low band) of the 5 GHz band). That is, the first channel 701 is assigned to devices located in the first geographical sector 708 and the first channel 701 is reused between opposite building faces. That is, the first channel 701 is also assigned to devices located in the second geographical sector 710. In addition, a third geographical sector 712 and a fourth geographical sector 714 of the second pico-cell unit 704 are assigned a second channel 703 of the first frequency band. That is, the second channel 703 is assigned to devices located in the third geographical sector 712 and the second channel 703 is reused between opposite building faces. That is, the second channel 703 is also assigned to devices located in the fourth geographical sector 714. The first channel 701 and the second channel 703 are non-adjacent channels in the first frequency band. The first geographical sector 708 and the third geographical sector 712 are physically adjacent and the second geographical sector 710 and the fourth geographical sector 714 are physically adjacent. The first pico-cell unit 702 is also a sectorized pico-cell unit that is physically adjacent to the second pico-cell unit 704. The first pico-cell unit 702 is assigned a third channel 705 and a fourth channel 707 of the first frequency band in a similar fashion as the second pico-cell unit 704. The third pico-cell unit 706 is assigned a fifth channel 709 and a sixth channel 711 of the first frequency band in a similar fashion as the second pico-cell unit 704. The third channel 705 and the fourth channel 707 are non-adjacent channels and the fifth channel 709 and the sixth channel 711 are non-adjacent channels. The first channel 701 can be adjacent to the third channel 705.

In another implementation, the non-adjacent channels of a first frequency band are assigned to a first set of channels and a second set of channels in an alternating configuration for alternative adjacent channel interference (AACI). The first set of channels can be assigned to the devices located in a first geographical sector of the first pico-cell (e.g., the gateway and customer STAs (low-band GW-STA). The second set of channels can be assigned to the devices located in a second geographical sector of the first pico-cell, the first and geographical sectors being physically adjacent geographical sectors. The first set of channels is assigned to the devices located in a third geographical sector of the first pico-cell and the second set of channels is assigned to the devices located in a fourth geographical sector of the first pico-cell, the third geographical sector and the fourth geographical sector being physically adjacent geographical sectors. The first and third geographical sectors can be opposing sectors.

The first frequency band can be the low-band of the 5 GHz frequency band. The low-band can be used to isolate the gateway-to-customer-station (GW-STA) connectivity from the base-station-to-relay (BS-RL) connectivity, acting as a sub-band filter. The channels can be organized as three channel groups (G1, G2, G3) and can maximize frequency re-use and building and building-to-building connectivity is adjacent channel (ACI) as set forth below in FIG. 8.

Figure 8:
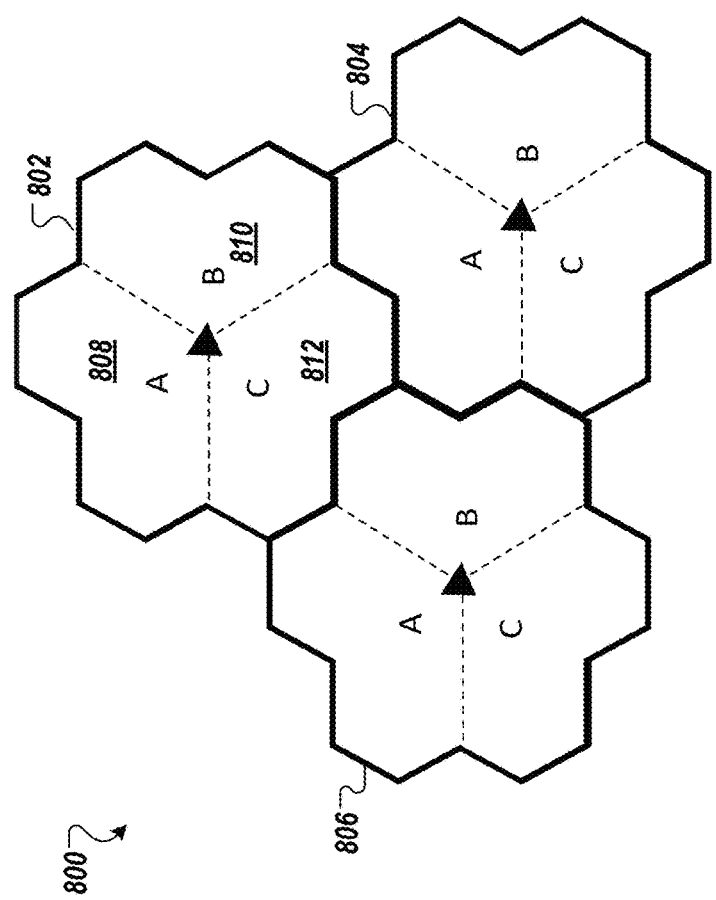
FIG. 8 illustrates nano-cell sectorization of multiple nano-cell units of a micro-cell unit according to one embodiment.
Figure 8:
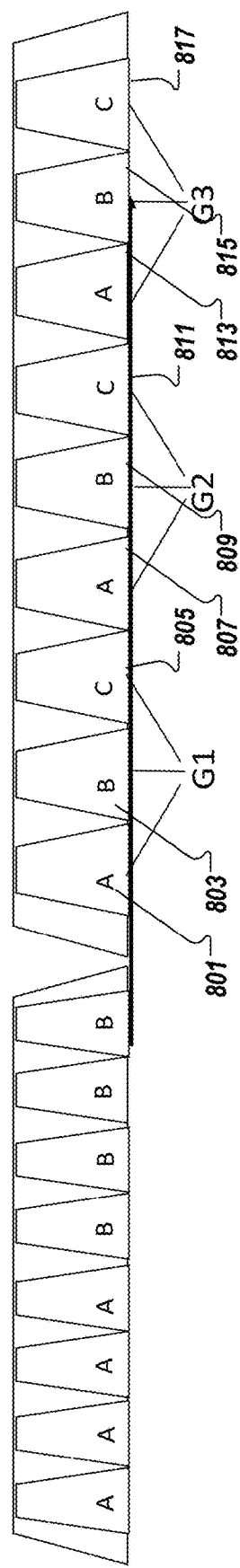

FIG. 8 illustrates nano-cell sectorization 800 of multiple nano-cell units 802-806 of a micro-cell unit according to one embodiment. As illustrated, each of the nano-cell units 802-806 are sectorized nano-cell units in which adjacent channels of a second frequency band (e.g., U-NII-2 or U-NII-3 or U-NII-ext (High Band) of the 5 GHz frequency band) are assigned to three geographical sectors in a sequential configuration (e.g., ABC configuration). In particular, the first nano-cell unit 802 is a sectorized nano-cell unit in which adjacent channels of the second frequency band are assigned to three geographical sectors in a sequential configuration. That is, a first channel 801 of the second frequency band is assigned to devices located in a first geographical sector 808 of the first nano-cell unit 802, a second channel 803 of the second frequency band is assigned to the devices located in a second geographical sector 810 of the first nano-cell unit 802, and a third channel 805 of the second frequency band is assigned to the devices located in a third geographical sector 812 of the first nano-cell unit 802. The first, second, and third channels 801-805 are adjacent channels. The second nano-cell unit 804 is also a sectorized nano-cell unit that is physically adjacent to the first nano-cell unit 802 and assigned a fourth channel 807, a fifth channel 809, and a sixth channel 811 of the second frequency band. The fourth, fifth, and sixth channels 807-8011 are adjacent channels. The third channel 805 and the fourth channel 807 are adjacent channels. The third nano-cell unit 806 is also a sectorized nano-cell unit that is physically adjacent to the first nano-cell unit 802 and the second nano-cell unit 804 and assigned a seventh channel 813, an eighth channel 815, and a ninth channel 817 of the second frequency band. The seventh, eighth, and ninth channels 813-817 are adjacent channels. The sixth channel 811 and the seventh channel 813 are adjacent channels.

As illustrated in FIG. 8, the adjacent (ACI) channels are organized in an ABC configuration and radios on the same device use channels A and C (AACI). The second frequency band can be the high-band of the 5 GHz frequency band. The high-band can be used to isolate the BS-RL connectivity from the GW-STA connectivity, acting as a sub-band filter. The channels can be organized as three channel groups (G1, G2, G3), depending on out-of-network channel usage, interference, and DFS activity.

Figure 9A:
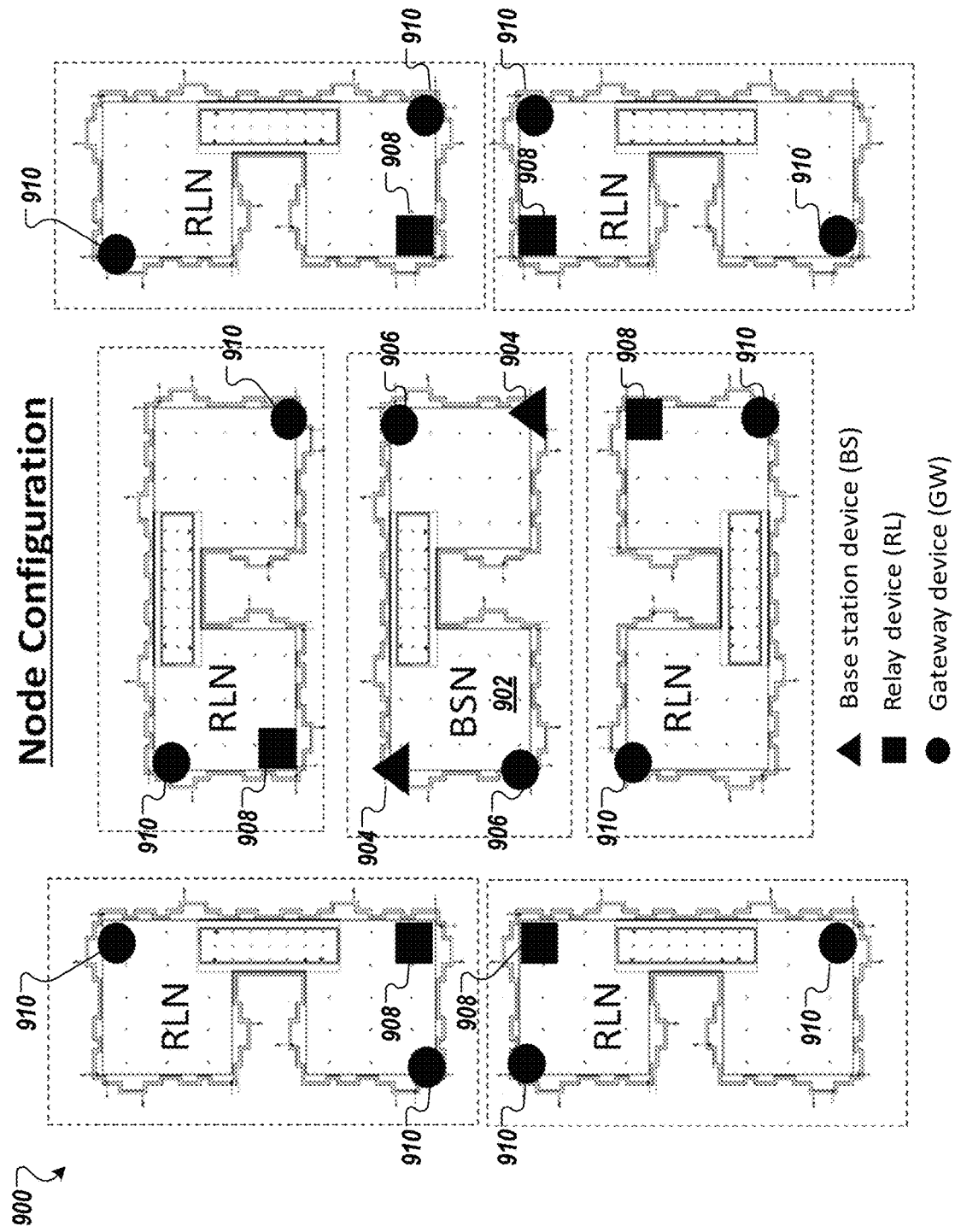
FIG. 9A illustrates an exemplary node configuration of a wireless network according to one embodiment.
Figure 9B:
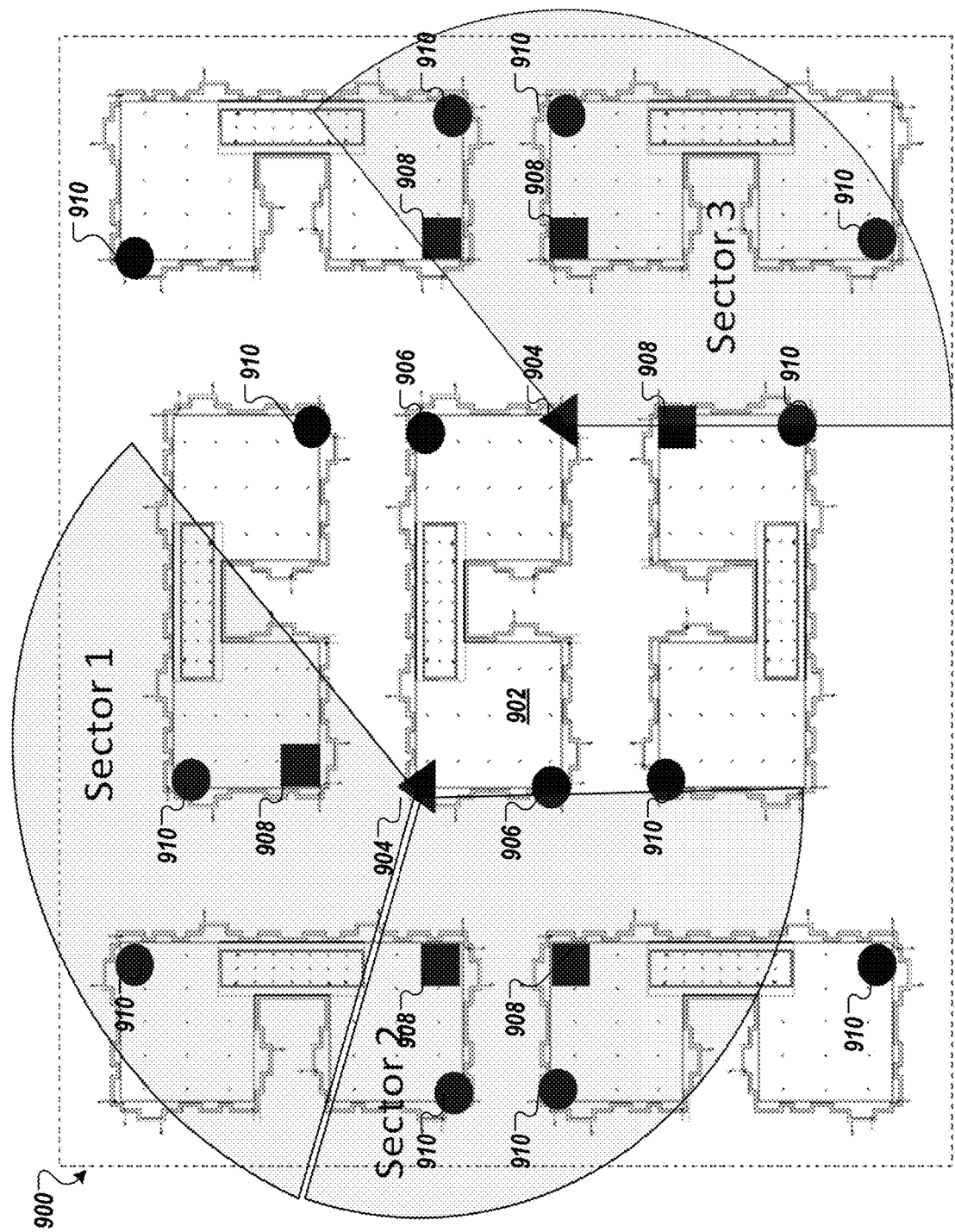
FIG. 9B illustrates sector coverages of a nano-cell unit according to one embodiment.
Figure 9C:
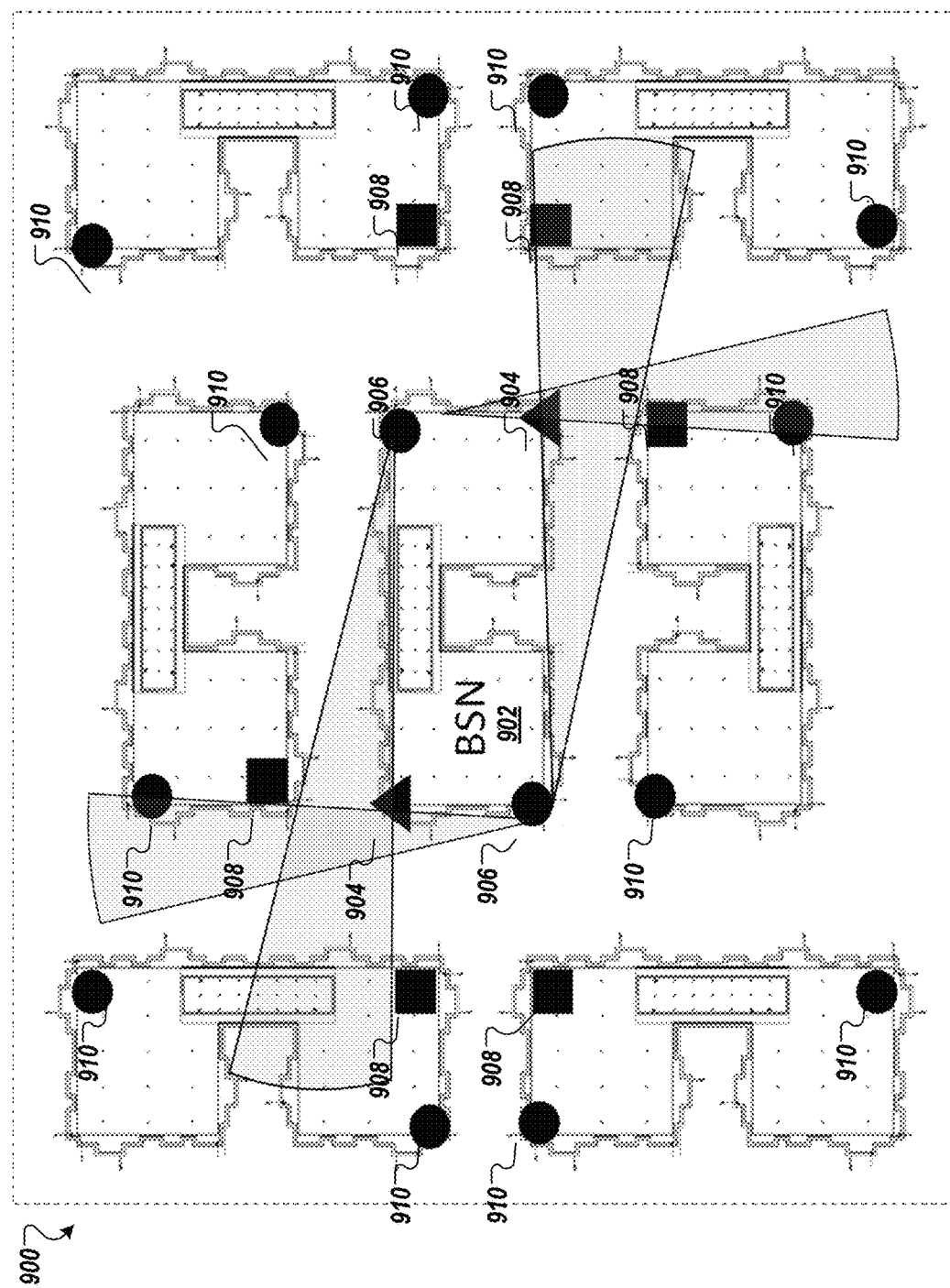
FIG. 9C illustrates sector coverage of a multi-building pico-cell unit according to one embodiment.

FIG. 9A illustrates an exemplary node configuration 900 of a wireless network according to one embodiment. In the node configuration 900, there can be multiple nodes, one node per building. As illustrated, a first building includes a BSN 902, including two base station devices 904 and two gateway devices 906. The five other buildings include a RLN 908, each including at least one relay device 910 and multiple gateway devices 912. As described above, the nano-cell units and the pico-cell units can be sectorized. An example of the nano-cell sector coverages is illustrated in FIG. 9B and an example of the pico-cell sector coverages is illustrated in FIG. 9C. It should be noted that the pico-cell sector coverage is shown only for the BSN node. It should also be noted that it is possible to cover multiple buildings from a single BSN or RLN (referred to as multi-building pico-cell unit).

Figure 10:
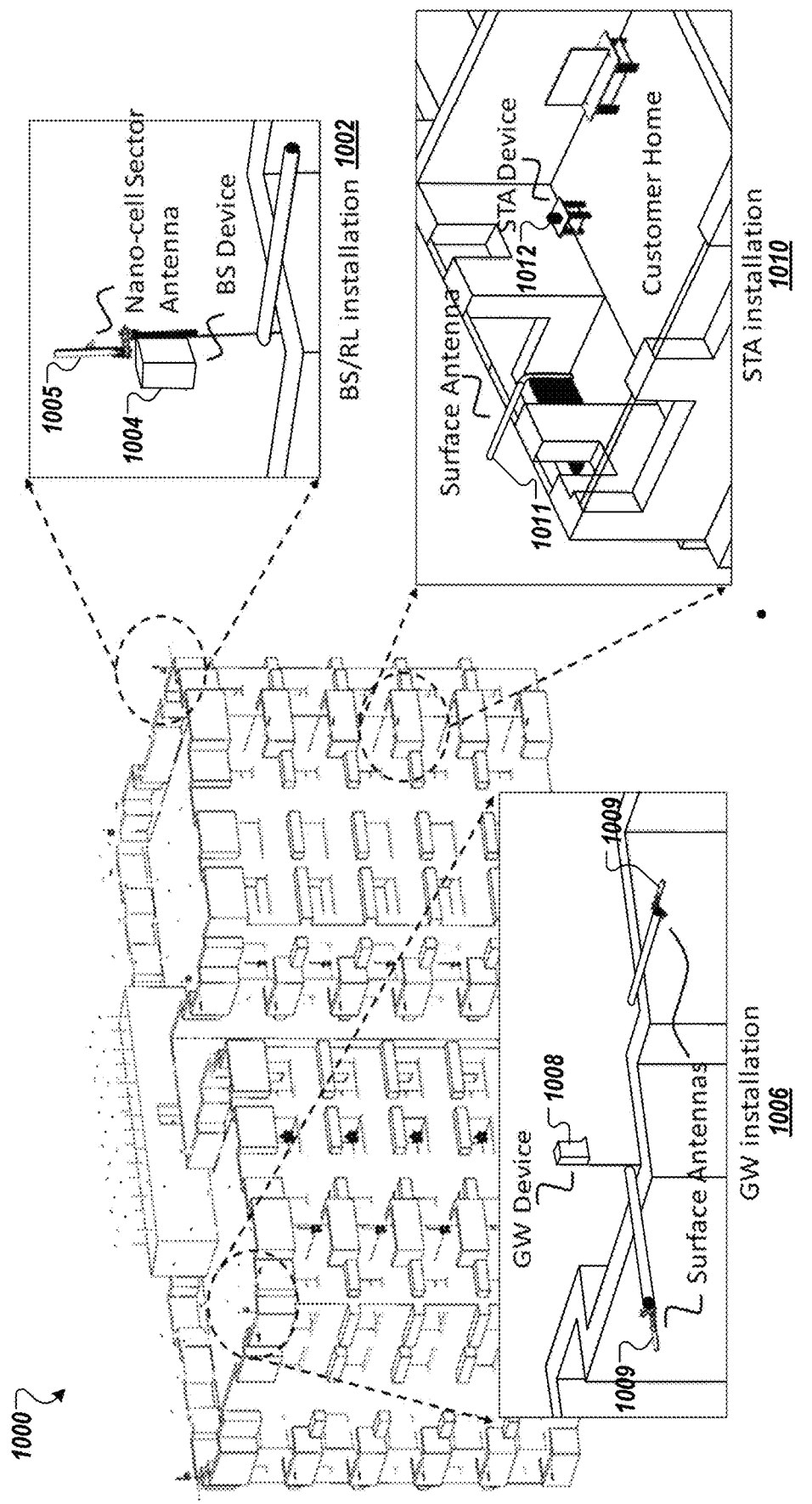
FIG. 10 illustrates a MDU with a first installation of a base station or relay device (BS/RL device), a second installation of a gateway device, and a third installation of a customer station according to one embodiment.

FIG. 10 illustrates a MDU 1000 with a first installation 1002 of a base station or relay device (BS/RL device) 1004, a second installation 1006 of a gateway device 1008, and a third installation 1010 of a customer station 1012 according to one embodiment. The first installation 1002 can be on a roof of the MDU 1000. For example, the BS/RL device 1004 can be mounted to a pole on the roof of the MDU 1000. The BS/RL device 1004 can be coupled to a nano-cell sector antenna 1005 that is also mounted on the pole. The second installation 1006 can also be on a roof of the MDU 1000. The first installation 1002 and the second installation 1006 can be at the same location or at different locations on the MDU 1000. For example, the gateway device 1008 can be mounted to a second pole on the roof of the MDU 1000. The gateway device 1008 can be coupled to one or more surface antennas 1009 that can also be mounted on a pole that extends out from the MDU 1000. The third installation 1010 can be in a customer's home within the MDU 1000. For example, the customer station 1012 can be placed within the customer's home, such as on a table, on a floor, or the like. The customer station 1012 can be coupled to one or more surface antennas 1011 that can also be mounted on a pole that extends out from the MDU 1000. Additional installations can be at other customer's homes within the MDU 1000.

Figure 11:
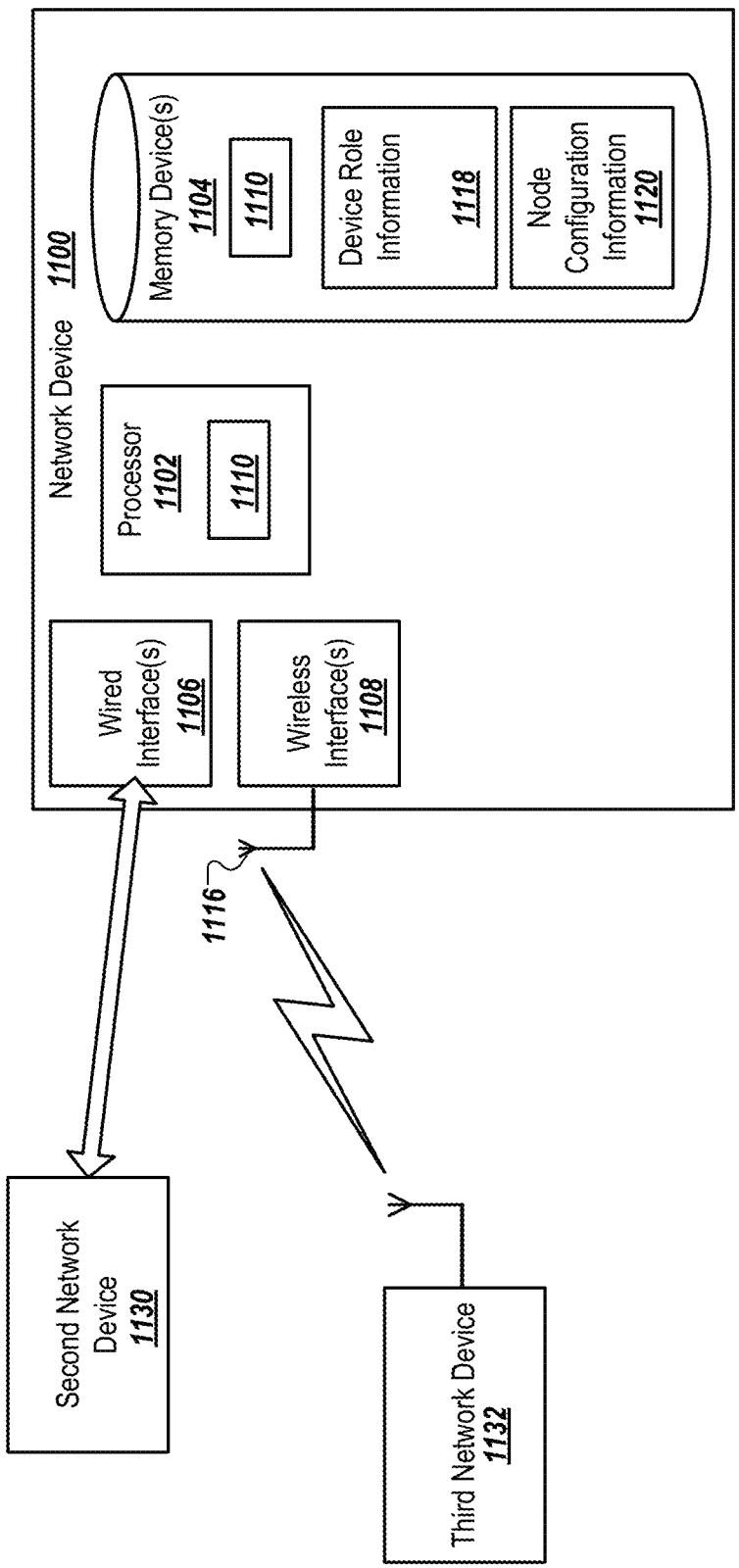
FIG. 11 is a block diagram of a network device that can be configured to operate as a device role and a node of a cascaded star topology according to one embodiment.

FIG. 11 is a block diagram of a network device 1100 that can be configured to operate according to a device role and a node of a cascaded star topology according to one embodiment. In FIG. 11, the network device 1100 includes one or more processors 1102 (hereinafter referred to as "processor"), one or more memory devices 1104 (hereinafter referred to as "memory device"), one or more wired interfaces 1106, and one or more wireless interfaces 1108. For the one or more wired interfaces 1106, the network device 1100 can include one or more hardware ports (not illustrated in FIG. 11). For the one or more wireless interfaces 1108, the network device 1100 can include one or more radios (not illustrated in FIG. 11) and one or more antennas 1116.

The processor 1102 can be various type of processing devices, such as one or more Central Processing Units (CPUs), microcontrollers, field programmable gate arrays, or other types of processors or processing devices. The processor 1102 can implement processing logic 1110 that comprises hardware (e.g., circuitry, dedicated logic, programmable logic, microcode, etc.), software, firmware, or a combination thereof. The processing logic 1110 can configure the network device 1100 to operate according to a device role using the device role information 1118 and according to a node of a cascaded start topology using the node configuration information 1120 as described herein. The memory device 1104 can be any type of memory or storage device and can store instructions that implement the processing logic 1110, the device role information 1118, and the node configuration information 1120. The processor 1102 can communicate with other devices over the wired interfaces 1106 and wireless interfaces 1108. The wireless interfaces 1108 can implement one or more types of radio technologies, such as, for example, Wireless Local Area Network (WLAN) technologies, Wireless Personal Area Network (WPAN) technologies, cellular technologies, Long Range (LoRa) technologies, Body Area Network (BAN) technologies, Near-Me (NAN) technologies, or the like.

In one embodiment, the one or more memory devices 1104 store device role information 1118 and node configuration information 1120. The device role information 1118 can include device settings for each of the following device roles: a RT role, a BS role, a RL role, a GW role, a customer STA role, a NAS role, or the like. The node configuration information 1120 can include node settings for each of the device roles within each of the following node types: BSN, RLN, or CPE node. The node configuration information 1120 can also include information about the hardware available at the network device 1100, including hardware that is plugged into the hardware ports of the network device 1100. For example, the node configuration information 1120 can be determined during a boot-up process, such as by the Basic Input/output System (BIOS). The device role information 1118 and the node configuration information 1120 can be stored in memory, registers, a specified file, or the like. The node configuration information 1120 can also include an indication of whether a storage device is attached to a hardware port of the network device 1100. The device role information 1118 can be used to allow the network device 1100 to be configured as one of the types of devices described herein. The node configuration information 1120 can include information about the connections of the network device 1100. For example, the node configuration information 1120 can list each of the external connections to other devices, such as over wired interfaces or wireless interfaces. In one embodiment, the node configuration information 1120 includes an IP address for a WAN port. In other embodiments, the node configuration information 1120 includes IP addresses of a private subnet. As described herein, the node configuration information 1120 can be used by the network device 1100 to be configured according to a specific role for the network device 1100, depending on where the network device 1100 is disposed in the cascaded star topology.

During operation and after a power-up event, the processor 1102 can configure the device role and node configuration using the device role information 1118 and the node configuration information 1120. The operations to perform the device role process can be done by the processing logic 1110. The processing logic 1110 can receive a first command identifying a first node of a wireless network, the first node being a first node type. The first node is one node in a cascaded star topology of the wireless network. Responsive to the first command, the processing logic 1110 configures the network device 1100 to be part of a first set of devices at the first node using the node configuration information 1120. The processing logic 1110 receives a second command identifying a first device role for the network device 1100. Responsive to the second command, the processing logic 1110 configures the network device 1100 to operate as the first device role using the device role information 1118, establish a wired connection with a second device (e.g., second network device 113) in the first set of devices at the first node, and configures the first radio of the wireless interface 1108 to communicate with a third device (e.g., third network device 1132) in a second node over a first wireless link. The processing device, responsive to the second command, configures the second radio of the wireless interface 1108 to communicate with a fourth device in a third node over a second wireless link.

In a further embodiment, the processing logic 1110, after the first command and the second command, receives a third command identifying a third node of the wireless network, the third node being a second node type that is different than the first node type. The third command can be initiated as part of a repurposing process that repurposes the network device 1100 as a different device type or as a different node type. Responsive to the third command, the processing logic 1110 configures the network device 1100 to be part of a second set of devices at the third node using the node configuration information 1120. After the first command and the second command, the processing logic 1110 receives a fourth command identifying a second device role for the network device 1100. Responsive to the fourth command, the processing logic 1110 configures the network device 1100 to operate as the second device role using the device role information 1118, establish a wired connection with a fourth device in the second set of devices at the third node, and configure at least one of the radios of the wireless interface 1108 to communicate with a fifth device in a fourth node over a wireless link.

In other embodiments, the network device 1100 includes other components, such as peripheral ports, wired interface ports (e.g., Ethernet ports), directional antennas, omnidirectional antennas, serial interfaces (e.g., USB, PCIe, PSGMII), card readers, volatile memory, non-volatile memory, universal asynchronous receiver/transmitter (UART), general purpose input-output terminals, integrated radios with or without dedicated CPU cores, multilayer switch/router, pin connectors to allow external antennas to be coupled to the network device 1100, RF modules, or the like.

Figure 12:
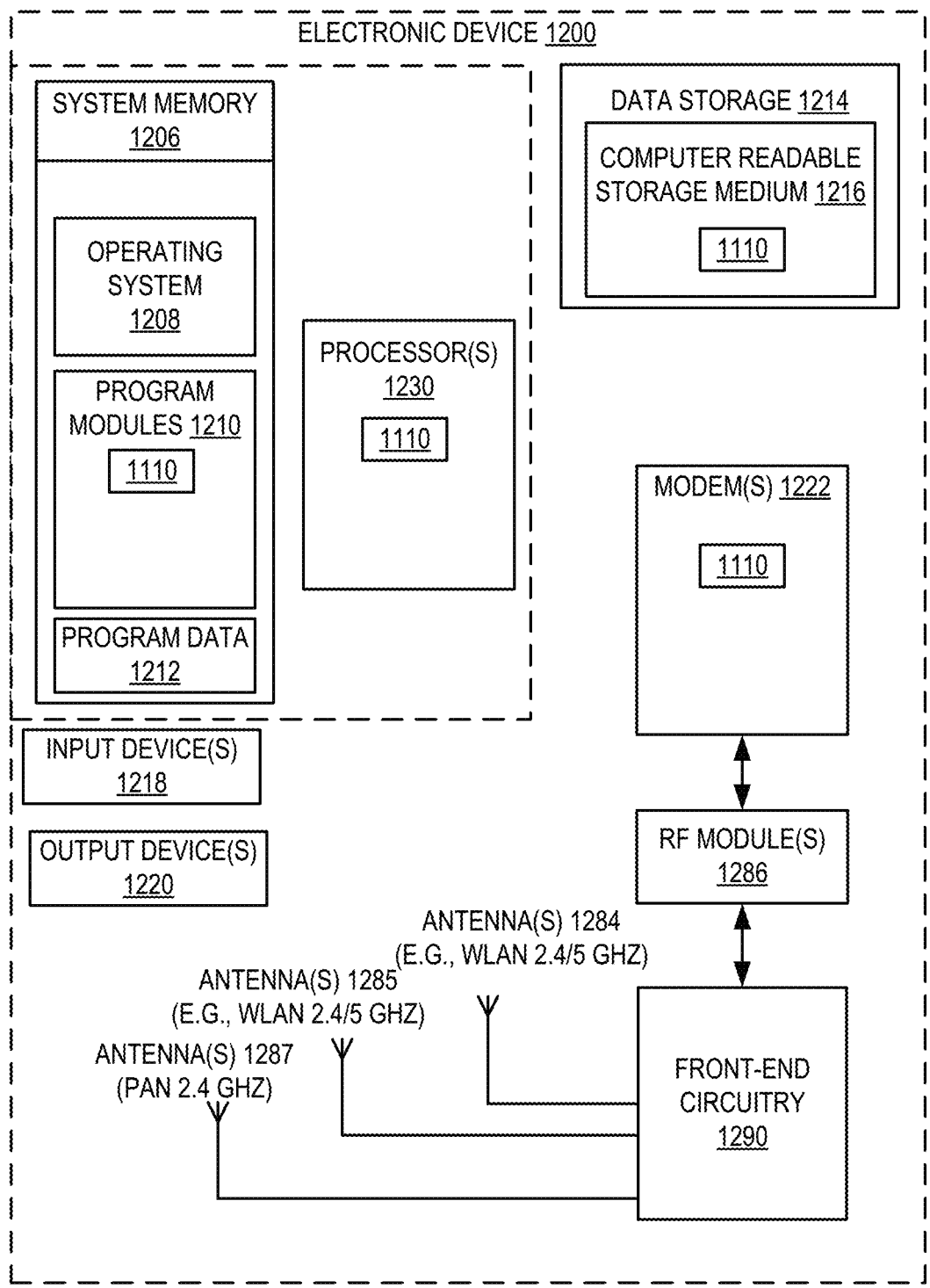
FIG. 12 is a block diagram of an electronic device that can be configured to operate as a device role and a node of a cascaded star topology according to one embodiment.

FIG. 12 is a block diagram of an electronic device 1200 that can be configured to operate according to a device role and a node of a cascaded star topology according to one embodiment. The electronic device 1200 may correspond to the electronic devices described above with respect to FIGS. 1-10. Alternatively, the electronic device 1200 may be other electronic devices, as described herein.

The electronic device 1200 includes one or more processor(s) 1230, such as one or more CPUs, microcontrollers, field programmable gate arrays, or other types of processors. The electronic device 1200 also includes system memory 1206, which may correspond to any combination of volatile and/or non-volatile storage mechanisms. The system memory 1206 stores information that provides operating system component 1208, various program modules 1210, program data 1212, and/or other components. In one embodiment, the system memory 1206 stores instructions of methods to control operation of the electronic device 1200. The electronic device 1200 performs functions by using the processor(s) 1230 to execute instructions provided by the system memory 1206. In one embodiment, the program modules 1210 may include processing logic 1110. The processing logic 1110 may perform some or all of the operations descried herein.

The electronic device 1200 also includes a data storage device 1214 that may be composed of one or more types of removable storage and/or one or more types of non-removable storage. The data storage device 1214 includes a computer-readable storage medium 1216 on which is stored one or more sets of instructions embodying any of the methodologies or functions described herein. Instructions for the program modules 1210 (e.g., processing logic 1110) may reside, completely or at least partially, within the computer-readable storage medium 1216, system memory 1206 and/or within the processor(s) 1230 during execution thereof by the electronic device 1200, the system memory 1206 and the processor(s) 1230 also constituting computer-readable media. The electronic device 1200 may also include one or more input devices 1218 (keyboard, mouse device, specialized selection keys, etc.) and one or more output devices 1220 (displays, printers, audio output mechanisms, etc.).

The electronic device 1200 further includes a modem 1222 to allow the electronic device 1200 to communicate via a wireless connections (e.g., such as provided by the wireless communication system) with other computing devices, such as remote computers, an item providing system, and so forth. The modem 1222 can be connected to one or more radio frequency (RF) modules 1286. The RF modules 1286 may be a WLAN module, a WAN module, WPAN module, Global Positioning System (GPS) module, or the like. The antenna structures (antenna(s) 1284, 1285, 1287) are coupled to the front-end circuitry 1290, which is coupled to the modem 1022. The front-end circuitry 1290 may include radio front-end circuitry, antenna switching circuitry, impedance matching circuitry, or the like. The antennas 1284 may be GPS antennas, Near-Field Communication (NFC) antennas, other WAN antennas, WLAN or PAN antennas, or the like. The modem 1222 allows the electronic device 1200 to handle both voice and non-voice communications (such as communications for text messages, multimedia messages, media downloads, web browsing, etc.) with a wireless communication system. The modem 1222 may provide network connectivity using any type of mobile network technology including, for example, Cellular Digital Packet Data (CDPD), General Packet Radio Service (GPRS), EDGE, Universal Mobile Telecommunications System (UMTS), Single-Carrier Radio Transmission Technology (1×RTT), Evaluation Data Optimized (EVDO), High-Speed Down-Link Packet Access (HSDPA), Wi-Fi®, Long Term Evolution (LTE) and LTE Advanced (sometimes generally referred to as 4G), etc.

The modem 1222 may generate signals and send these signals to antenna(s) 1284 of a first type (e.g., WLAN 5 GHz), antenna(s) 1285 of a second type (e.g., WLAN 2.4 GHz), and/or antenna(s) 1287 of a third type (e.g., WAN), via front-end circuitry 1290, and RF module(s) 1286 as descried herein. Antennas 1284, 1285, 1287 may be configured to transmit in different frequency bands and/or using different wireless communication protocols. The antennas 1284, 1285, 1287 may be directional, omnidirectional, or non-directional antennas. In addition to sending data, antennas 1284, 1285, 1287 may also receive data, which is sent to appropriate RF modules connected to the antennas. One of the antennas 1284, 1285, 1287 may be any combination of the antenna structures described herein.

In one embodiment, the electronic device 1200 establishes a first connection using a first wireless communication protocol, and a second connection using a different wireless communication protocol. The first wireless connection and second wireless connection may be active concurrently, for example, if an electronic device is receiving a media item from another electronic device via the first connection) and transferring a file to another electronic device (e.g., via the second connection) at the same time. Alternatively, the two connections may be active concurrently during wireless communications with multiple devices. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna structure and the second wireless connection is associated with a second antenna.

Though a modem 1222 is shown to control transmission and reception via antenna (1284, 1285, 1287), the electronic device 1200 may alternatively include multiple modems, each of which is configured to transmit/receive data via a different antenna and/or wireless transmission protocol.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to convey the substance of their work most effectively to others skilled in the art. An algorithm is used herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, Read-Only Memories (ROMs), compact disc ROMs (CD-ROMs) and magnetic-optical disks, Random Access Memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A wireless network comprising:
    a router device;
    a base station node comprising a first network switch, a base station device, a first gateway device, and a first storage device, wherein the base station device, the first gateway device, and the first storage device are coupled to the first network switch, wherein the first network switch is coupled to the router device over a wired connection, wherein the router device, the base station device, the first gateway device, and the first storage device each comprises identical hardware;
a relay node comprising a second network switch, a relay device, a second gateway device, and a second storage device, wherein the relay device, the second gateway device, and the second storage device are coupled to the second network switch, wherein the relay device, the second gateway device, and second storage device each comprises the identical hardware; and
a first customer premises equipment (CPE) node comprising a customer station (STA) device and one or more endpoint devices, wherein the customer STA device comprises the identical hardware, wherein:
the base station node (i) connects to an Internet Service Provider (ISP) ingress via the router device, (ii) provides a first wireless service to the relay node, and (iii) provides a second wireless service to a second CPE node using the first gateway device;
the relay node (i) connects to the base station node via the first wireless service using the relay device and (ii) provides a third wireless service to the first CPE node using the second gateway device;
the customer STA device provides access point functionality to the one or more endpoint devices; and
the base station node, the relay node, the first CPE node, and the second CPE node are organized logically in a cascaded star topology in which: (i) the base station node is a first-tier hub with respect to the relay node and the second CPE node; and (ii) the relay node is a second-tier hub with respect to the first CPE node.

2. The wireless network of claim 1, wherein:
the base station device comprises one or more radios that provide the first wireless service to the relay node and any other relay nodes that are located within a first distance from the base station device;
the relay device comprises one or more radios that connect with the base station device via the first wireless service and provide the third wireless service to the first CPE node and any other CPE nodes that are located within a second distance from the relay device;
the first gateway device comprises one or more radios that provide the second wireless service to the second CPE node and any other CPE nodes that are located within a third distance from the first gateway device; and
the second gateway device comprises one or more radios that provide the third wireless service to the first CPE node and any other CPE nodes that are located within a fourth distance from the second gateway device.

3. The wireless network of claim 1, further comprising:
a first nano-cell unit comprising a first dwelling unit and a second dwelling unit, wherein the first dwelling unit is served by the first gateway device disposed on a roof of the first dwelling unit and the second dwelling unit is served by the second gateway device disposed on a roof of the second dwelling unit;
a second nano-cell unit coupled to the first nano-cell unit via a link, the second nano-cell unit comprising at least a third dwelling unit served by a third gateway device of a second base station node; and
a micro-cell unit comprising the first nano-cell unit and the second nano-cell unit.

4. A wireless network comprising:
a first node comprising a first device, a second device, and a first network switch coupled between the first device and the second device;
a second node comprising a third device, a fourth device, and a second network switch coupled between the third device and the fourth device;
a third node comprising a fifth device, the third node being a first client of the second node; and
a fourth node comprising a sixth device, the fourth node being a first client of the first node, wherein:
the first device is configured to operate as a base station (BS) device;
the second device is configured to operate as a first gateway (GW) device;
the third device is configured to operate as a relay (RL) device;
the fourth device is configured to operate as a second GW device;
the fifth device is configured to operate as a first customer station (STA) device;
the sixth device is configured to operate as a second customer STA device;
the first node and the fourth node are physically organized as part of a first pico-cell unit;
the second node and the third node are physically organized as part of a second pico-cell unit; and
the first pico-cell unit and the second pico-cell unit are physically organized as part of a first nano-cell unit.

5. The wireless network of claim 4, further comprising:
a fifth node comprising a seventh device, an eighth device, and a third network switch coupled between the seventh device and the eighth device; and
a sixth node comprising a ninth device, the sixth node being a first client of the fifth node; wherein:
first device, the second device, the third device, the fourth device, the fifth device, the sixth device, the seventh device, the eighth device, and the ninth device each comprises identical hardware;
the seventh device is configured to operate as a second RL;
the eighth device is configured to operate as a third GW; and
the ninth device is configured to operate as a third customer STA device.

6. The wireless network of claim 4, further comprising a seventh node comprising a tenth device, wherein the tenth device is a second client of the first node, wherein first device, the second device, the third device, the fourth device, the fifth device, the sixth device, and the tenth device each comprises identical hardware, and wherein the tenth device is configured to operate as a third customer STA device.

7. The wireless network of claim 6, wherein the first node, the fourth node, and the seventh node are physically organized as part of the first pico-cell unit, wherein the second node and the third node are physically organized as part of the second pico-cell unit, wherein the first pico-cell unit and the second pico-cell unit are physically organized as part of the first nano-cell unit.

8. The wireless network of claim 4, further comprising an eighth node comprising an eleventh device, wherein the eleventh device is a second client of the second node, wherein the first device, the second device, the third device, the fourth device, the fifth device, the sixth device, and the eleventh device each comprises identical hardware, and wherein the eleventh device is configured to operate as a third customer STA device.

9. The wireless network of claim 8, wherein the first node and the fourth node are physically organized as part of the first pico-cell unit, wherein the second node, the third node, and the eighth node are physically organized as part of the second pico-cell unit, wherein the first pico-cell unit and the second pico-cell unit are physically organized as part of the first nano-cell unit.

10. The wireless network of claim 4, further comprising a ninth node comprising a twelfth device, a thirteenth device, and a fourth network switch coupled between the twelfth device and the thirteenth device, wherein:
the first device, the second device, the third device, the fourth device, the fifth device, the sixth device, twelfth device, and the thirteenth device each comprises identical hardware;
the twelfth device is configured to operate as a second BS; and
the thirteenth device is configured to operate as a third GW.

11. The wireless network of claim 10, wherein the first node and the fourth node are physically organized as part of the first pico-cell unit, wherein the second node and the third node are physically organized as part of the second pico-cell unit, wherein the first pico-cell unit and the second pico-cell unit are physically organized as part of the first nano-cell unit, wherein the ninth node is physically organized as part of a second nano-cell unit, and wherein the first nano-cell unit and the second nano-cell unit are physically organized as part of a micro-cell unit.

12. The wireless network of claim 11, wherein all devices of the first pico-cell unit are disposed on or within a first building, wherein all devices of the second pico-cell unit are disposed on or within a second building.

13. The wireless network of claim 4, wherein the first device, the second device, and the first network switch of the first node are disposed on a roof of a first building and the sixth device of the fourth node is disposed on or within a second building that is in proximity to the first building, wherein the third device, the fourth device, and the second network switch of the second node are disposed on a roof of a third building and the fifth device of the third node is disposed on or within a fourth building that is in proximity to the second building.

14. The wireless network of claim 13, wherein the first pico-cell unit comprises the first building and the second building, wherein the the second pico-cell unit comprises the third building and the fourth building.

15. The wireless network of claim 4, wherein:
non-adjacent channels of a first frequency band are assigned to geographical sectors of the first pico-cell unit in an alternating configuration in which:
a first channel of the first frequency band is assigned to the devices located in a first geographical sector and a second geographical sector;
a second channel of the first frequency band is assigned to the devices located in a third geographical sector and a fourth geographical sector;
the first channel and the second channel are non-adjacent channels;
the first geographical sector and the third geographical sector are physically adjacent;
the second geographical sector and the fourth geographical sector are physically adjacent;
the second pico-cell unit is a sectorized pico-cell unit that is physically adjacent to the first pico-cell unit and assigned a third channel and a fourth channel of the first frequency band;
the third channel and the fourth channel are non-adjacent channels; and
the first channel and the third channel are adjacent channels.

16. The wireless network of claim 4, wherein:
adjacent channels of a second frequency band are assigned to geographical sectors of the first nano-cell unit in a sequential configuration in which:
a first channel of the second frequency band is assigned to the devices located in a first geographical sector of the first nano-cell unit;
a second channel of the second frequency band is assigned to the devices located in a second geographical sector of the first nano-cell unit;
a third channel of the second frequency band is assigned to the devices located in a third geographical sector of the first nano-cell unit;
a second nano-cell unit is a sectorized nano-cell unit that is physically adjacent to the first nano-cell unit and assigned a fourth channel, a fifth channel, and a sixth channel of the second frequency band;
the fourth channel, the fifth channel, and the sixth channel are adjacent channels; and
the third channel and the fourth channel are adjacent channels.

17. A wireless network comprising:
a first node comprising a first device, a second device, and a first network switch coupled between the first device and the second device;
a second node comprising a third device, a fourth device, and a second network switch coupled between the third device and the fourth device, wherein:
the first device is configured to operate as a base station (BS) device;
the second device is configured to operate as a first gateway (GW) device;
the third device is configured to operate as a relay (RL) device;
the fourth device is configured to operate as a second GW device;
the first node is physically organized as part of a first pico-cell unit;
the second node is physically organized as part of a second pico-cell unit; and
the first pico-cell unit and the second pico-cell unit are physically organized as part of a nano-cell unit.

18. The wireless network of claim 17, further comprising:
a third node comprising a fifth device, the third node being a first client of the second node; and
a fourth node comprising a sixth device, the fourth node being a first client of the first node, wherein the first device, the second device, the third device, the fourth device, the fifth device, and the sixth device each comprises identical hardware.

* * * * *